US012562167B2

(12) United States Patent
Smith

(10) Patent No.: US 12,562,167 B2
(45) Date of Patent: *Feb. 24, 2026

(54) LOCALIZED WAKEWORD VERIFICATION

(71) Applicant: Sonos, Inc., Santa Barbara, CA (US)

(72) Inventor: Connor Kristopher Smith, New Hudson, MI (US)

(73) Assignee: Sonos, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,731

(22) Filed: Apr. 15, 2024

(65) Prior Publication Data

US 2024/0412729 A1 Dec. 12, 2024

Related U.S. Application Data

(63) Continuation of application No. 17/722,661, filed on Apr. 18, 2022, now Pat. No. 11,961,519, which is a
(Continued)

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G06F 3/167* (2013.01); *G10L 15/08* (2013.01);
(Continued)

(58) Field of Classification Search
CPC ......... G06F 3/165; G06F 3/167; G06F 16/60; G06Q 30/0255; G06T 7/74; G08B 15/002;
(Continued)

(56) References Cited

U.S. PATENT DOCUMENTS

| | | | |
|---|---|---|---|
| 6,704,671 B1 | 3/2004 | Umminger, III | |
| 7,567,907 B2 * | 7/2009 | Greene .................. | G11B 19/02 |
| | | | 704/251 |

(Continued)

FOREIGN PATENT DOCUMENTS

| | | |
|---|---|---|
| CN | 101569093 A | 10/2009 |
| EP | 3142107 A1 | 3/2017 |

(Continued)

OTHER PUBLICATIONS

Advisory Action mailed on Dec. 13, 2023, issued in connection with U.S. Appl. No. 18/048,034, filed Oct. 20, 2022, 4 pages.
(Continued)

*Primary Examiner* — Gerald Gauthier

(57) ABSTRACT

In one aspect, a networked microphone device is configured to (i) receive sound data, (ii) determine, via the wake-word engine, that a first portion of the sound data is representative of a wake word, (iii) determine that a second networked microphone device was added to a media playback system, (iv) transmit the first portion of the sound data to a second networked microphone device, (v) begin determining a command to be performed by the first networked microphone device, (vi) receive an indication of whether the first portion of the sound data is representative of the wake word, and (vii) output a response indicative of whether the first portion of the sound data is representative of the wake word.

20 Claims, 13 Drawing Sheets

Related U.S. Application Data continuation of application No. 16/785,244, filed on Feb. 7, 2020, now Pat. No. 11,308,958.

(51) Int. Cl.

| | |
|---|---|
| *G10L 15/08* | (2006.01) |
| *H04R 1/40* | (2006.01) |
| *H04R 3/00* | (2006.01) |
| *H04R 29/00* | (2006.01) |

(52) U.S. Cl.

CPC ............. *H04R 1/406* (2013.01); *H04R 3/005* (2013.01); *H04R 29/005* (2013.01); *G10L 2015/088* (2013.01); *G10L 2015/223* (2013.01)

(58) Field of Classification Search

CPC ....... G10L 15/06; G10L 15/063; G10L 15/08; G10L 15/16; G10L 15/22; G10L 15/30; G10L 15/32; G10L 17/00; G10L 17/02; G10L 21/0232; G10L 2015/088; G10L 2015/223; G10L 17/24; H04L 12/2816; H04M 3/568; H04R 1/406; H04R 3/005; H04R 5/027; H04R 29/004; H04R 29/005; H04R 2227/005; G06V 40/20; G11B 19/02; H04N 7/17336; H05B 47/197

See application file for complete search history.

(56) References Cited

U.S. PATENT DOCUMENTS

| | | | |
|---|---|---|---|
| 8,239,206 B1 | 8/2012 | LeBeau et al. | |
| 8,359,621 B2 * | 1/2013 | Medina | H04N 7/17336 704/270.1 |
| 8,566,722 B2 | 10/2013 | Gordon et al. | |
| 8,719,039 B1 * | 5/2014 | Sharifi | G10L 15/063 704/251 |
| 8,798,995 B1 * | 8/2014 | Edara | G06Q 30/0255 704/211 |
| 9,226,088 B2 * | 12/2015 | Pandey | H04M 3/568 |
| 9,373,321 B2 * | 6/2016 | Bapat | G10L 15/06 |
| 9,431,021 B1 | 8/2016 | Scalise et al. | |
| 9,548,053 B1 * | 1/2017 | Basye | G10L 15/22 |
| 9,632,748 B2 | 4/2017 | Faaborg et al. | |
| 9,940,930 B1 | 4/2018 | Campbell et al. | |
| 9,997,151 B1 | 6/2018 | Ayrapetian et al. | |
| 10,097,919 B2 | 10/2018 | Jarvis et al. | |
| 10,102,848 B2 * | 10/2018 | Koulomzin | G10L 15/08 |
| 10,127,908 B1 | 11/2018 | Deller et al. | |
| 10,152,969 B2 | 12/2018 | Reilly et al. | |
| 10,192,546 B1 * | 1/2019 | Piersol | G10L 15/08 |
| 10,204,624 B1 * | 2/2019 | Knudson | G10L 15/22 |
| 10,248,376 B2 | 4/2019 | Keyser-Allen et al. | |
| 10,482,899 B2 | 11/2019 | Ramprashad et al. | |
| 10,510,362 B2 * | 12/2019 | Hicks | H04R 1/406 |
| 10,555,077 B2 | 2/2020 | Jarvis | |
| 10,720,173 B2 | 7/2020 | Freeman et al. | |
| 10,871,943 B1 | 12/2020 | D'Amato | |
| 10,885,091 B1 | 1/2021 | Meng et al. | |
| 11,095,978 B2 | 8/2021 | Gigandet et al. | |
| 11,140,494 B2 | 10/2021 | Pedersen et al. | |
| 11,184,704 B2 | 11/2021 | Jarvis | |
| 11,189,284 B2 | 11/2021 | Maeng | |
| 11,302,326 B2 | 4/2022 | Sereshki | |
| 11,308,958 B2 * | 4/2022 | Smith | G10L 15/32 |
| 11,354,092 B2 | 6/2022 | D'Amato | |
| 11,532,306 B2 * | 12/2022 | Kim | H04R 1/406 |
| 11,580,969 B2 | 2/2023 | Han et al. | |
| 11,646,023 B2 | 5/2023 | Smith | |
| 11,664,023 B2 | 5/2023 | Reilly | |
| 11,694,689 B2 | 7/2023 | Smith | |
| 11,700,139 B2 * | 7/2023 | Drake | H04L 12/2816 704/275 |
| 11,709,653 B1 | 7/2023 | Shin | |
| 11,711,662 B2 * | 7/2023 | Stachura | H04K 3/65 704/251 |
| 11,714,600 B2 | 8/2023 | D'Amato | |
| 11,721,341 B2 * | 8/2023 | Kim | G10L 15/22 704/251 |
| 11,727,930 B2 * | 8/2023 | Topcu | G06F 3/017 704/251 |
| 11,727,936 B2 | 8/2023 | Smith | |
| 11,769,505 B2 | 9/2023 | Sereshki | |
| 11,790,937 B2 | 10/2023 | Smith et al. | |
| 11,816,393 B2 | 11/2023 | Vega-Zayas et al. | |
| 11,817,076 B2 | 11/2023 | Sereshki et al. | |
| 11,832,068 B2 | 11/2023 | Jarvis et al. | |
| 11,961,519 B2 * | 4/2024 | Smith | H04R 1/406 |
| 2005/0131558 A1 | 6/2005 | Braithwaite et al. | |
| 2006/0161964 A1 | 7/2006 | Chung | |
| 2007/0142944 A1 | 6/2007 | Goldberg et al. | |
| 2013/0171930 A1 | 7/2013 | Anand et al. | |
| 2014/0122092 A1 * | 5/2014 | Goldstein | G06F 3/165 704/275 |
| 2014/0253676 A1 | 9/2014 | Nagase et al. | |
| 2015/0112689 A1 | 4/2015 | Nandy et al. | |
| 2015/0154953 A1 * | 6/2015 | Bapat | G10L 15/06 704/251 |
| 2015/0154954 A1 * | 6/2015 | Sharifi | G10L 15/22 704/251 |
| 2015/0215382 A1 | 7/2015 | Arora et al. | |
| 2015/0248885 A1 | 9/2015 | Koulomzin | |
| 2015/0279351 A1 | 10/2015 | Nguyen et al. | |
| 2015/0356968 A1 | 12/2015 | Rice et al. | |
| 2016/0078864 A1 | 3/2016 | Palanisamy et al. | |
| 2016/0098393 A1 | 4/2016 | Hebert | |
| 2016/0118048 A1 | 4/2016 | Heide | |
| 2016/0189716 A1 * | 6/2016 | Lindahl | G10L 17/24 704/251 |
| 2017/0084292 A1 | 3/2017 | Yoo | |
| 2017/0242653 A1 | 8/2017 | Lang et al. | |
| 2017/0287496 A1 | 10/2017 | Heitkamp et al. | |
| 2017/0332035 A1 | 11/2017 | Shah et al. | |
| 2017/0337932 A1 | 11/2017 | Iyengar et al. | |
| 2017/0353789 A1 * | 12/2017 | Kim | H04R 5/027 |
| 2018/0033428 A1 | 2/2018 | Kim et al. | |
| 2018/0040324 A1 * | 2/2018 | Wilberding | G10L 17/02 |
| 2018/0330589 A1 * | 11/2018 | Horling | G08B 15/002 |
| 2019/0147860 A1 * | 5/2019 | Chen | G10L 15/08 704/251 |
| 2019/0259408 A1 * | 8/2019 | Freeman | G10L 21/0232 |
| 2020/0007987 A1 * | 1/2020 | Woo | G10L 15/22 |
| 2020/0043494 A1 | 2/2020 | Maeng | |
| 2020/0089469 A1 | 3/2020 | Wilberding et al. | |
| 2020/0167597 A1 * | 5/2020 | Nguyen | G06T 7/74 |
| 2020/0265842 A1 * | 8/2020 | Singh | G10L 17/00 |
| 2020/0364026 A1 | 11/2020 | Lee et al. | |
| 2020/0395006 A1 * | 12/2020 | Smith | G10L 15/083 |
| 2021/0029452 A1 | 1/2021 | Tsoi et al. | |
| 2021/0134280 A1 * | 5/2021 | Kurtz | G10L 15/30 |
| 2021/0157542 A1 | 5/2021 | De Assis et al. | |
| 2021/0174812 A1 * | 6/2021 | Gao | G10L 15/22 |
| 2021/0210085 A1 * | 7/2021 | Smith | G10L 17/24 |
| 2021/0239831 A1 | 8/2021 | Shin et al. | |
| 2021/0249004 A1 * | 8/2021 | Smith | G10L 15/22 |
| 2021/0287670 A1 | 9/2021 | Regan et al. | |
| 2022/0035514 A1 | 2/2022 | Shin et al. | |
| 2023/0019595 A1 * | 1/2023 | Smith | G10L 15/32 |
| 2023/0215433 A1 * | 7/2023 | Myers | G10L 15/08 704/251 |
| 2023/0237998 A1 * | 7/2023 | Smith | G10L 15/30 704/251 |
| 2023/0274738 A1 * | 8/2023 | Smith | G06F 3/167 704/251 |
| 2023/0382349 A1 | 11/2023 | Ham | |
| 2024/0412729 A1 * | 12/2024 | Smith | H04R 3/005 |

FOREIGN PATENT DOCUMENTS

| | | | |
|---|---|---|---|
| WO | 9731437 A1 | 8/1997 | |
| WO | 2016014686 | 1/2016 | |

(56)          References Cited

FOREIGN PATENT DOCUMENTS

| WO | 2018064362 A1 | 4/2018 |
| WO | 2020061439 A1 | 3/2020 |
| WO | 2020068795 A1 | 4/2020 |
| WO | 2020132298 A1 | 6/2020 |

OTHER PUBLICATIONS

Advisory Action mailed on Feb. 26, 2024, issued in connection with U.S. Appl. No. 17/532,744, filed Nov. 22, 2021, 4 pages.
Australian Patent Office, Australian Examination Report Action mailed on Oct. 31, 2023, issued in connection with Australian Application No. 2023203687, 2 pages.
Canadian Patent Office, Canadian Examination Report mailed on Oct. 12, 2023, issued in connection with Canadian Application No. 3084279, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Apr. 29, 2024, issued in connection with Canadian Application No. 3164558, 4 pages.
Canadian Patent Office, Canadian Examination Report mailed on Jan. 3, 2024, issued in connection with Canadian Application No. 3123601, 3 pages.
Canadian Patent Office, Canadian Examination Report mailed on May 8, 2024, issued in connection with Canadian Application No. 3146914, 5 pages.
Chinese Patent Office, First Office Action and Translation mailed on Apr. 23, 2024, issued in connection with Chinese Application No. 202110542908.5, 10 pages.
European Patent Office, European EPC Article 94.3 mailed on Jan. 10, 2024, issued in connection with European Application No. 20757152.2, 6 pages.
European Patent Office, European EPC Article 94.3 mailed on Oct. 12, 2023, issued in connection with European Application No. 20736489.4, 8 pages.
European Patent Office, European EPC Article 94.3 mailed on Dec. 18, 2023, issued in connection with European Application No. 21703134.3, 7 pages.
European Patent Office, European EPC Article 94.3 mailed on Jan. 24, 2024, issued in connection with European Application No. 21180778.9, 8 pages.
European Patent Office, European EPC Article 94.3 mailed on Nov. 27, 2023, issued in connection with European Application No. 19780508.8, 7 pages.
European Patent Office, European EPC Article 94.3 mailed on Feb. 28, 2024, issued in connection with European Application No. 18306501, 7 pages.
European Patent Office, European EPC Article 94.3 mailed on Nov. 28, 2023, issued in connection with European Application No. 19731415.6, 9 pages.
European Patent Office, European EPC Article 94.3 mailed on Apr. 29, 2024, issued in connection with European Application No. 21195031.6, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jun. 4, 2024, issued in connection with European Application No. 21180778.9, 5 pages.
European Patent Office, European Extended Search Report mailed on Jan. 2, 2024, issued in connection with European Application No. 23188226.7, 10 pages.
European Patent Office, European Search Report mailed on Feb. 2, 2024, issued in connection with European Application No. 23200723.7, 5 pages.
Final Office Action mailed on Feb. 27, 2024, issued in connection with U.S. Appl. No. 17/340,590, filed Jun. 7, 2021, 28 pages.

Final Office Action mailed on Oct. 6, 2023, issued in connection with U.S. Appl. No. 17/532,744, filed Nov. 22, 2021, 21 pages.
Final Office Action mailed on Jul. 8, 2024, issued in connection with U.S. Appl. No. 17/222,950, filed Apr. 5, 2021, 10 pages.
Indian Patent Office, Examination Report mailed on Feb. 28, 2024, issued in connection with Indian Patent Application No. 201847035625, 3 pages.
Indian Patent Office, Examination Report mailed on Dec. 5, 2023, issued in connection with Indian Patent Application No. 201847035625, 3 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Non-Final Office Action mailed on Feb. 1, 2024, issued in connection with U.S. Appl. No. 18/313,013, filed May 5, 2023, 47 pages.
Non-Final Office Action mailed on May 1, 2024, issued in connection with U.S. Appl. No. 17/650,441, filed Feb. 9, 2022, 12 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.
Non-Final Office Action mailed on Mar. 13, 2024, issued in connection with U.S. Appl. No. 18/309,939, filed May 1, 2023, 15 pages.
Non-Final Office Action mailed on Jan. 18, 2024, issued in connection with U.S. Appl. No. 18/048,034, filed Oct. 20, 2022, 10 pages.
Non-Final Office Action mailed on Mar. 18, 2024, issued in connection with U.S. Appl. No. 17/532,744, filed Nov. 22, 2021, 20 pages.
Non-Final Office Action mailed on Jan. 19, 2024, issued in connection with U.S. Appl. No. 18/331,580, filed Jun. 8, 2023, 11 pages.
Non-Final Office Action mailed on Jun. 20, 2024, issued in connection with U.S. Appl. No. 18/007,415, filed Jan. 30, 2023, 12 pages.
Non-Final Office Action mailed on Jun. 20, 2024, issued in connection with U.S. Appl. No. 18/520,336, filed Nov. 27, 2023, 20 pages.
Non-Final Office Action mailed on May 20, 2024, issued in connection with U.S. Appl. No. 18/600,044, filed Mar. 8, 2024, 24 pages.
Non-Final Office Action mailed on Nov. 21, 2023, issued in connection with U.S. Appl. No. 18/088,976, filed Dec. 27, 2022, 9 pages.
Non-Final Office Action mailed on Oct. 23, 2023, issued in connection with U.S. Appl. No. 17/932,715, filed Sep. 16, 2022, 14 pages.
Non-Final Office Action mailed on Apr. 24, 2024, issued in connection with U.S. Appl. No. 18/461,430, filed Sep. 5, 2023, 22 pages.
Non-Final Office Action mailed on Apr. 26, 2024, issued in connection with U.S. Appl. No. 18/310,025, filed May 1, 2023, 9 pages.
Non-Final Office Action mailed on Jan. 26, 2024, issued in connection with U.S. Appl. No. 17/450,925, filed Oct. 14, 2021, 9 pages.
Non-Final Office Action mailed on Aug. 28, 2023, issued in connection with U.S. Appl. No. 17/722,661, filed Apr. 18, 2022, 16 pages.
Non-Final Office Action mailed on Mar. 28, 2024, issued in connection with U.S. Appl. No. 18/192,452, filed Mar. 29, 2023, 7 pages.
Non-Final Office Action mailed on Feb. 29, 2024, issued in connection with U.S. Appl. No. 18/449,244, filed Aug. 14, 2023, 15 pages.
Non-Final Office Action mailed on May 30, 2024, issued in connection with U.S. Appl. No. 18/503,971, filed Nov. 7, 2023, 8 pages.

(56)        References Cited

OTHER PUBLICATIONS

Non-Final Office Action mailed on Oct. 6, 2023, issued in connection with U.S. Appl. No. 17/222,950, filed Apr. 5, 2021, 9 pages.
Non-Final Office Action mailed on Jul. 8, 2024, issued in connection with U.S. Appl. No. 18/520,531, filed Nov. 27, 2023, 63 pages.
Notice of Allowance mailed on Mar. 13, 2024, issued in connection with U.S. Appl. No. 18/449,254, filed Aug. 14, 2023, 10 pages.
Notice of Allowance mailed on Dec. 14, 2023, issued in connection with U.S. Appl. No. 17/722,661, filed Apr. 18, 2022, 12 pages.
Notice of Allowance mailed on Dec. 15, 2023, issued in connection with U.S. Appl. No. 18/157,937, filed Jan. 23, 2023, 8 pages.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Oct. 2, 2023, issued in connection with U.S. Appl. No. 17/810,533, filed Jul. 1, 2022, 8 pages.
Notice of Allowance mailed on May 24, 2024, issued in connection with U.S. Appl. No. 18/154,228, filed Jan. 13, 2023, 8 pages.

Notice of Allowance mailed on Nov. 24, 2023, issued in connection with U.S. Appl. No. 18/070,024, filed Nov. 28, 2022, 7 pages.
Notice of Allowance mailed on Mar. 27, 2024, issued in connection with U.S. Appl. No. 18/061,570, filed Dec. 5, 2022, 8 pages.
Notice of Allowance mailed on Sep. 27, 2023, issued in connection with U.S. Appl. No. 17/656,794, filed Mar. 28, 2022, 11 pages.
Notice of Allowance mailed on Feb. 28, 2024, issued in connection with U.S. Appl. No. 16/989,350, filed Aug. 10, 2020, 9 pages.
Notice of Allowance mailed on Mar. 28, 2024, issued in connection with U.S. Appl. No. 18/316,400, filed May 12, 2023, 8 pages.
Notice of Allowance mailed on Jul. 3, 2024, issued in connection with U.S. Appl. No. 18/507,713, filed Nov. 13, 2023, 11 pages.
Notice of Allowance mailed on May 3, 2024, issued in connection with U.S. Appl. No. 18/331,580, filed Jun. 8, 2023, 7 pages.
Notice of Allowance mailed on Jun. 7, 2024, issued in connection with U.S. Appl. No. 18/316,434, filed May 12, 2023, 9 pages.
Notice of Allowance mailed on Mar. 8, 2024, issued in connection with U.S. Appl. No. 17/135,173, filed Dec. 28, 2020, 9 pages.
Notice of Allowance mailed on Nov. 8, 2023, issued in connection with U.S. Appl. No. 18/066,093, filed Dec. 14, 2022, 11 pages.

* cited by examiner

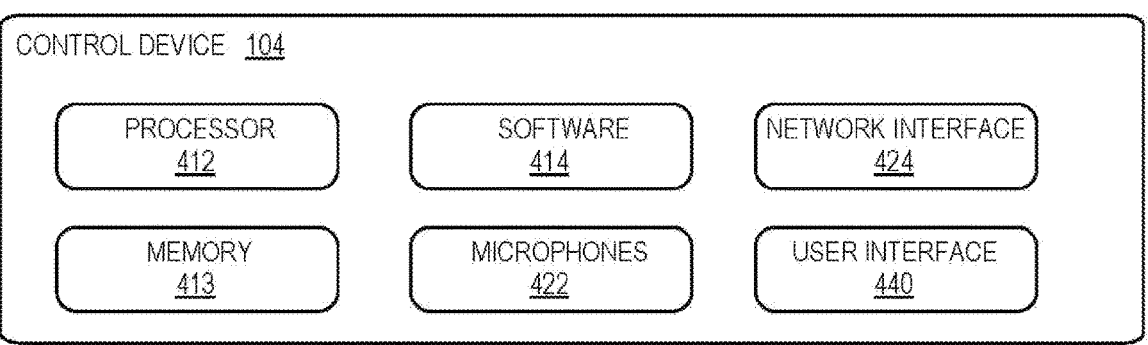

CONTROL DEVICE  104

PROCESSOR
412

SOFTWARE
414

NETWORK INTERFACE
424

MEMORY
413

MICROPHONES
422

USER INTERFACE
440

NOW PLAYING  (Office)

Track Title
Artist Name

444

QUEUE

Track 1
Track 2
Track 3
Track 4

446

Music Source 1    First VAS
Music Source 2    Second VAS
Music Source 3
+ ADD Music source   + ADD VAS source

448

442

Sonos   Browse   Rooms   Search music

No Music
Balcony                    Group

Audio Component
*Living Room*
Living Room                Group

No Music
Dining Room
+ Kitchen                  Group

No Music
Office                     Group

443

Sonos   Browse   Rooms   Search music

*Fig. 4C*

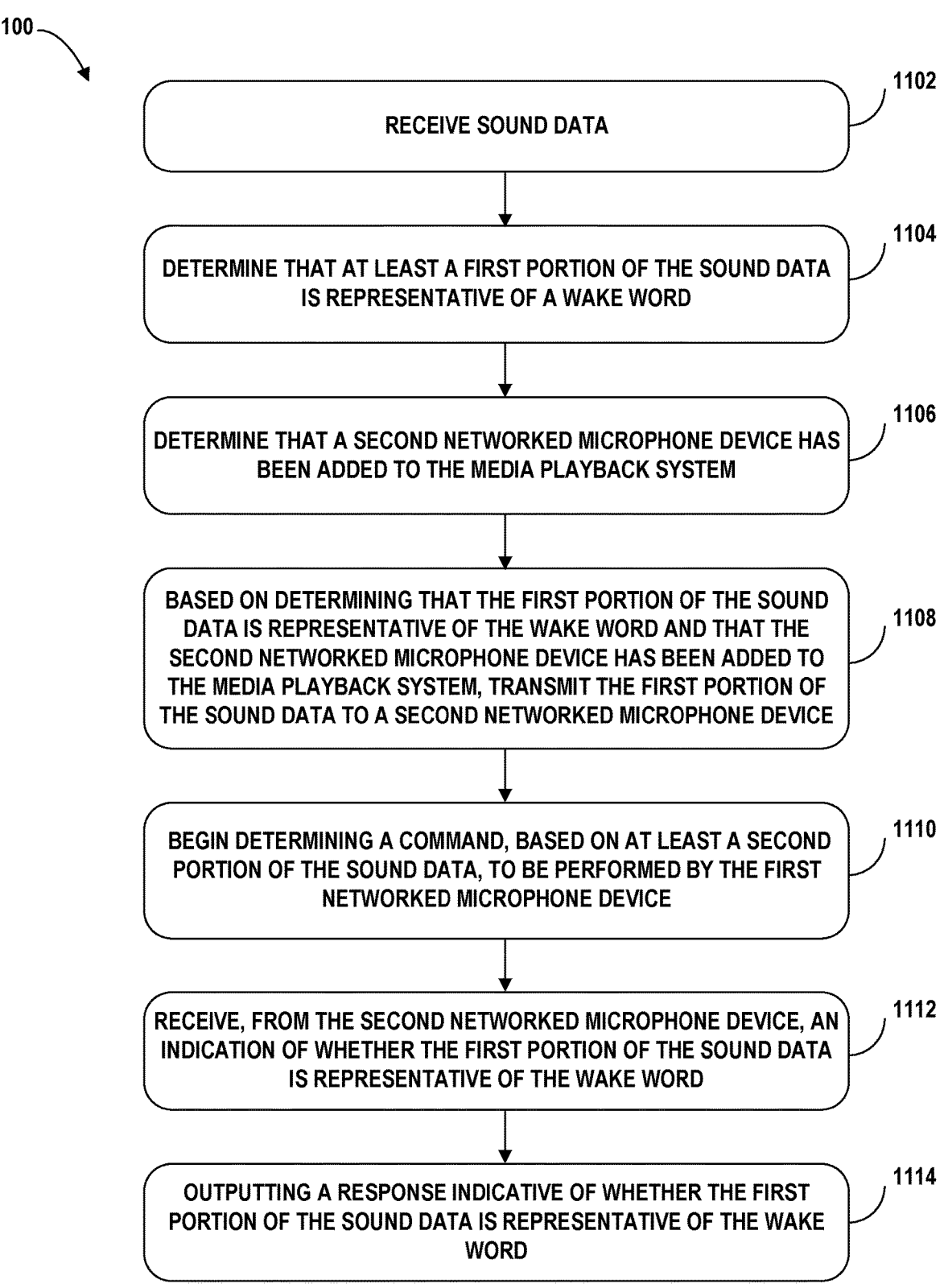

1100

1102   RECEIVE SOUND DATA

1104   DETERMINE THAT AT LEAST A FIRST PORTION OF THE SOUND DATA IS REPRESENTATIVE OF A WAKE WORD

1106   DETERMINE THAT A SECOND NETWORKED MICROPHONE DEVICE HAS BEEN ADDED TO THE MEDIA PLAYBACK SYSTEM

1108   BASED ON DETERMINING THAT THE FIRST PORTION OF THE SOUND DATA IS REPRESENTATIVE OF THE WAKE WORD AND THAT THE SECOND NETWORKED MICROPHONE DEVICE HAS BEEN ADDED TO THE MEDIA PLAYBACK SYSTEM, TRANSMIT THE FIRST PORTION OF THE SOUND DATA TO A SECOND NETWORKED MICROPHONE DEVICE

1110   BEGIN DETERMINING A COMMAND, BASED ON AT LEAST A SECOND PORTION OF THE SOUND DATA, TO BE PERFORMED BY THE FIRST NETWORKED MICROPHONE DEVICE

1112   RECEIVE, FROM THE SECOND NETWORKED MICROPHONE DEVICE, AN INDICATION OF WHETHER THE FIRST PORTION OF THE SOUND DATA IS REPRESENTATIVE OF THE WAKE WORD

1114   OUTPUTTING A RESPONSE INDICATIVE OF WHETHER THE FIRST PORTION OF THE SOUND DATA IS REPRESENTATIVE OF THE WAKE WORD

*Fig. 11*

LOCALIZED WAKEWORD VERIFICATION

CROSS-REFERENCE TO RELATED APPLICATIONS

This application claims priority as a continuation under 35 U.S.C. § 120 to U.S. application Ser. No. 17/722,661, filed on Apr. 18, 2022, which is a continuation of U.S. application Ser. No. 16/785,244, filed on Feb. 7, 2020, the contents of which are incorporated herein by reference in their entirety.

TECHNICAL FIELD

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 4A is a functional block diagram of an example controller device in accordance with aspects of the disclosure;

FIGS. 4B and 4C are controller interfaces in accordance with aspects of the disclosure;

FIG. 11 is a flow diagram of an example method in accordance with aspects of the disclosure.

Figure 1A:
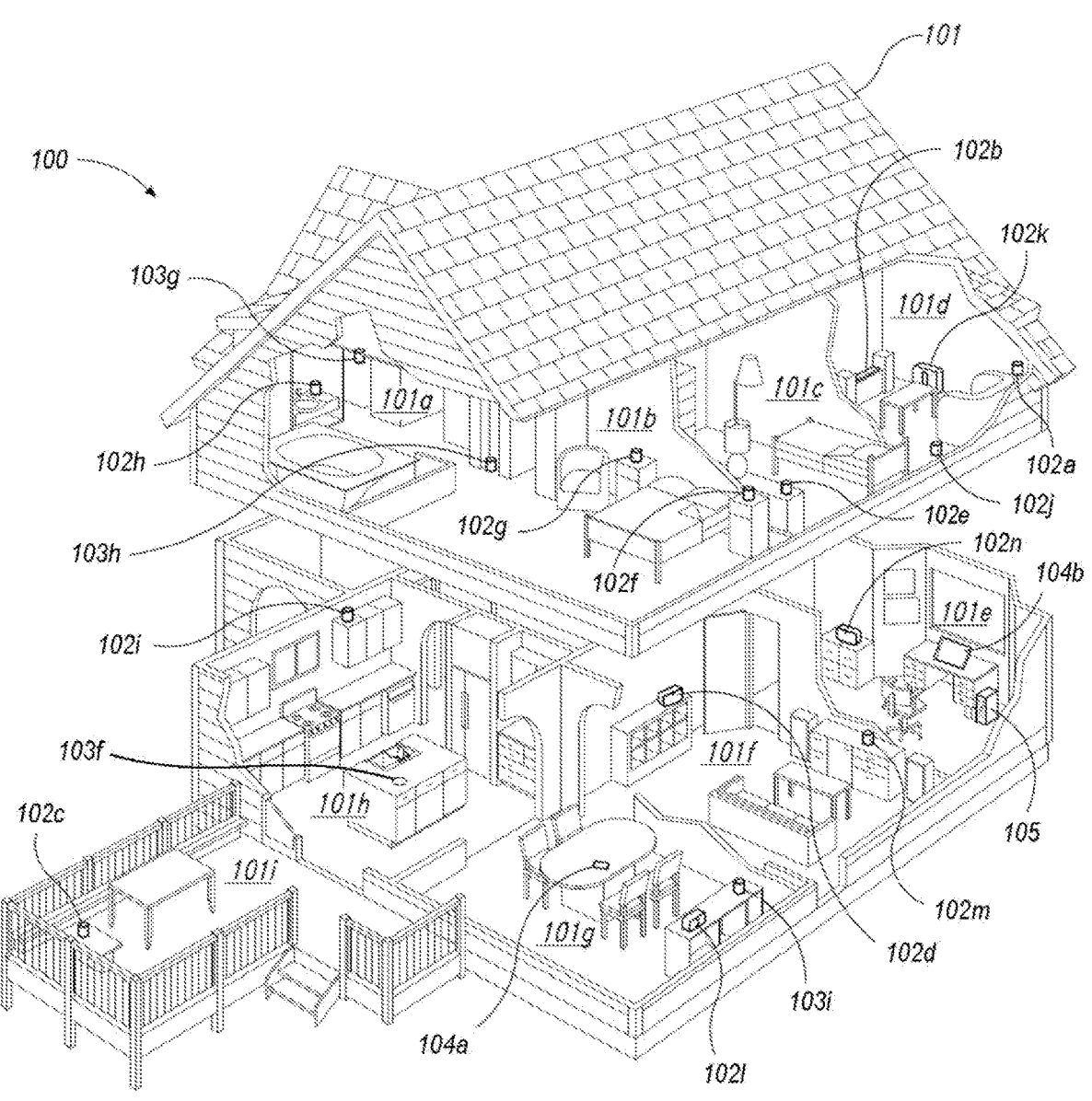
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Voice control can be beneficial in a "smart" home that includes smart appliances and devices that are connected to a communication network, such as wireless audio playback devices, illumination devices, and home-automation devices (e.g., thermostats, door locks, etc.). In some implementations, network microphone devices may be used to control smart home devices.

A network microphone device ("NMD") is a networked computing device that typically includes an arrangement of microphones, such as a microphone array, that is configured to detect sounds present in the NMD's environment. The detected sound may include a person's speech mixed with background noise (e.g., music being output by a playback device or other ambient noise). In practice, an NMD typically filters detected sound to remove the background noise from the person's speech to facilitate identifying whether the speech contains a voice input indicative of voice control. If so, the NMD may take action based on such a voice input.

A voice input will typically include a wake word followed by an utterance comprising a user request. In practice, a wake word is typically a predetermined word or phrase used to "wake up" an NMD and cause it to invoke a particular voice assistant service ("VAS") to interpret the intent of voice input in detected sound. For example, a user might speak the wake word "Alexa" to invoke the AMAZON VAS, "Ok, Google" to invoke the GOOGLE VAS, "Hey, Siri" to invoke the APPLE VAS, or "Hey, Sonos" to invoke a VAS offered by SONOS, among other examples. In practice, a wake word may also be referred to as, for example, an activation-, trigger-, wakeup-word or -phrase, and may take the form of any suitable word, combination of words (e.g., a particular phrase), and/or some other audio cue.

An NMD often employs a wake-word engine, which is typically onboard the NMD, to identify whether sound detected by the NMD contains a voice input that includes a particular wake word. The wake-word engine may be configured to identify (i.e., "spot") a particular wake word using one or more identification algorithms, including the use of machine learning models (e.g., neural networks). This wake-word identification process is commonly referred to as "keyword spotting." In practice, to help facilitate keyword spotting, the NMD may buffer sound detected by a microphone of the NMD and then use the wake-word engine to process that buffered sound to determine whether a wake word is present.

When a wake-word engine spots a wake word in detected sound, the NMD may determine that a wake-word event (i.e., a "wake-word trigger") has occurred, which indicates that the NMD has detected sound that includes a potential voice input. The occurrence of the wake-word event typically causes the NMD to perform additional processes involving the detected sound. In some implementations, these additional processes may include outputting an alert (e.g., an audible chime and/or a light indicator) indicating that a wake word has been identified and extracting detected-sound data from a buffer, among other possible additional processes. Extracting the detected sound may include reading out and packaging a stream of the detected sound according to a particular format for interpretation. In some instances, the NMD will interpret detected-sound using Spoken Language Understanding (SLU) techniques to determine a command (e.g., action) associated with the detected-sound (e.g., a command to group two NMDs together to play back media in synchrony). The NMD, after determining the command, may transmit the command to the appropriate VAS for execution. In other instances, the NMD may transmit the detected sound to a VAS for interpretation.

In turn, the VAS corresponding to the wake word that was identified by the wake-word engine receives the transmitted sound data from the NMD over a communication network. A VAS traditionally takes the form of a remote service implemented using one or more cloud servers configured to process voice inputs (e.g., AMAZON's ALEXA, APPLE's SIRI, MICROSOFT's CORTANA, GOOGLE'S ASSISTANT, etc.). In some instances, certain components and functionality of the VAS may be distributed across local and remote devices. Additionally, or alternatively, a VAS may take the form of a local service implemented at an NMD or a media playback system comprising the NMD such that a voice input or certain types of voice input (e.g., rudimentary commands) are processed locally without intervention from a remote VAS.

One challenge with some existing NMDs is that they can be prone to false positives caused by "false wake word" triggers. A false positive in the NMD context generally refers to detected sound input that erroneously invokes a VAS. One consequence of a false positive is that the NMD may seek to invoke a VAS, even though there is nobody actually speaking a wake word to the NMD. In practice, a false positive can occur in a variety of manners.

For example, a false positive can occur when a wake-word engine identifies a wake word in detected sound from audio (e.g., music, a podcast, etc.) playing in the environment of the NMD. This output audio may be playing from a playback device in the vicinity of the NMD or by the NMD itself. A word or phrase in output audio that causes a false positive may be referred to herein as a "false wake word." For instance, when the audio of a commercial advertising AMAZON's ALEXA service is output in the vicinity of the NMD, the word "Alexa" is considered a false wake word because it can cause a wake-word trigger to occur at the NMD.

In some instances, a false wake word may be a word that is phonetically similar to an actual wake word. For example, when the audio of a commercial advertising LEXUS automobiles is output in the vicinity of the NMD, the word "Lexus" is considered a false wake word because it can cause a wake-word trigger to occur at the NMD. In some instances, false positives caused by phonetic similarities to wake words may be attributable to the sensitivity level of a wake-word engine. In practice, a wake-word engine may be tuned to a higher sensitivity level to accommodate a wider range of dialectical and speech pattern variations for a given wake word, despite the possibility of this leading to an increase in false positives.

The occurrences of false positives are undesirable for a number of reasons. For example, an NMD prone to false positives can operate inefficiently. For instance, when a wake-word trigger occurs at an NMD due to a false positive, it may wake-up certain voice capture components from a standby (e.g., idle) state to an active state. When this occurs, the voice capture components draw additional power and consume valuable system resources until these components return to their normal standby state. As another example, a false positive may cause an NMD to chime unexpectedly and startle anyone nearby the NMD. As yet another example, a false positive may also interrupt audio playback, which can diminish a listening experience.

Typically, media playback systems address false positives by, after the NMD detects the presence of a wake word via a wake-word engine, transmitting the sound data to the appropriate VAS cloud service for verification of the wake word and determination of the action. In these situations, the processing of the sound data is offloaded to the VAS.

One challenge presented by offloading the sound data processing to a VAS is that the speed of the sound data processing depends upon the speed of the connection to the VAS, as well as the time difference between the time the sound data is transmitted to the VAS and the time the NMD can begin to process a command associated with the sound data. For example, a user may utter "Hey, Alexa, play "Born to Run." In this example, the NMD may determine that "Hey, Alexa" is a wake word that corresponds to AMAZON's ALEXA, and then transmit the sound data to AMAZON for processing. The NMD may then wait until it receives (i) verification from AMAZON that the utterance indeed invokes AMAZON's ALEXA, and (ii) AMAZON's determination that the user's command was to play "Born to Run." Only after receiving this the verification of the wake word and the determination of the command can the NMD then retrieve and play back the corresponding media content.

Another challenge that is presented by offloading the voice processing to a VAS is the privacy of the sound data, as the NMD typically sends an entire utterance to the VAS for processing after a wake word is detected. In the case where a false wake word is detected, a user's private conversation may be sent to the VAS regardless of the user's intention.

Yet another challenge is presented by offloading the voice processing to a VAS when a connection to the VAS cannot be established. In these situations, the VAS may be unavailable to process the sound data to determine (i) whether a wake word was uttered and (ii) the command associated with the sound data. This may be particularly undesirable as it may render the NMD unable to execute the user's command, providing a less-than-ideal user experience.

Example devices, systems, and methods configured in accordance with embodiments of the disclosure help address these and other challenges associated with offloading false positive verification to a VAS. In example embodiments, a first playback device of a networked media playback system includes components and functionality of an NMD (i.e., the playback device is "NMD-equipped"). In this respect, in addition to including one or more microphones configured to detect sounds present in the playback device's environment, the first playback device also includes a wake-word engine.

The wake-word engine may be configured to identify one or more particular wake words in sound detected by the first playback device's one or more microphones in a manner similar to that described above. When the first playback device, via its wake-word engine, identifies a wake word, it may then determine that a wake-word trigger occurred, resulting in the first playback device performing additional actions, as discussed previously above. In practice, the detected sound that is input to the wake-word engine may include audio that was output by the first playback device itself.

After determining that a wake-word trigger occurred, the first playback device may transmit the sound data to a second playback device for wake-word verification. While the second playback device is verifying the wake word, the first playback device may begin to determine a command associated with the sound data. This may be beneficial as it allows the first playback device to determine the command associated with the sound data in parallel with the second playback device's verification of the wake word.

The second playback device may contain the same or similar components (e.g., microphones and a wake-word engine) as the first playback device. The wake-word engine on the second playback device may be configured to identify the same wake words as the wake-word engine on the first playback device. The second playback device may also, upon the determination that the sound data does not contain the correct wake word, transmit a signal to the first playback device to cease determining the command associated with the sound data.

In operation, the wake-word engines on the first playback device and the second playback device may be configured differently depending on the capabilities and needs of each device. In one example, the wake-word engine on the second playback device may be tuned to be less sensitive at detecting wake words than the wake-word engine on the first playback device. For instance, if the wake word engine on the second playback device is configured to identify the wake word "Alexa," the wake-word engine on the first playback device may be set to a relatively higher sensitivity level to identify phonetically similar words, such as "Alexis," "Lexus," "Election," etc. to ensure that no wake words were missed. Meanwhile, the wake word engine on the second playback device may be set to a relatively lower sensitivity level to increase the accuracy of detecting the correct wake word, "Alexa." The difference in configurations of the wake-word engines may include the use of different speech recognition techniques and algorithms to detect the wake word. For instance, the respective wake-word engines may use differently sized or weighted neural networks to perform speech recognition.

In practice, when the first playback device determines that a wake-word trigger has occurred, the first playback device may send the sound data to the second playback device for wake word verification. The sound data sent to the second playback device make take various forms. In one example, the first playback device may send the sound data obtained via one or more microphones of the first playback device directly to the second playback device for processing. In this example, the second playback device may run a different signal processing configuration on the received sound data, which may include applying dereverberation or noise reduction to the received sound data to allow the second playback device to more easily detect the wake word. In another example, the first playback device may send the sound data after it performs some initial signal processing on the sound data. In this example, the second playback device may perform wake word detection on the processed sound data, but in a different manner than the first playback device (e.g., using a neural network that is configured differently than the neural network utilized by the first place device during the initial wake word detection). The sound data sent to the second playback device may take various other forms as well.

As previously discussed, the first playback device, after sending the sound data to the second playback device, may determine a command associated with the sound data while the second playback device verifies that a wake word was uttered. This parallel processing may reduce the amount of time between the user's utterance and performance of a command, providing a more desirable user experience.

The first playback device and the second playback device may complete their respective tasks before one another. In these situations, the first playback device and the second playback device may behave in various manners.

In one example, the first playback device may complete determining the command associated with the sound data before the second playback device determines whether the wake word was uttered. In this example, the first playback device may wait for the second playback device to complete determining whether the wake word was uttered before either (i) performing the determined command if the second playback device verifies that the wake word was uttered (ii) or foregoing performance of the determined command if the second playback device determines that the wake word was not uttered.

In another example, the second playback device may complete its determination of whether the wake word was uttered before the first playback device determines the command associated with the sound data. In this example, if the second playback device determines that the wake word was not uttered, the second playback device may send a signal to the first playback device causing the first playback device to cease determining the command associated with the sound data.

In some circumstances, the second playback device may become unavailable to determine that the wake word was uttered. In these circumstances, the first playback device may either (i) wait a predetermined amount of time before performing the command associated with the sound data or (ii) forgo performing the command if does not receive verification that the wake word was uttered. For example, the second playback device may be turned off or experience a connection issue with the first playback device. If this occurs, the first playback device may wait (e.g., for 3 seconds, etc.) and before performing the command without receiving verification from the second playback device. In another example, the first playback device may forgo performing the command if it never receives verification from the second playback device. The behavior of the first playback device may depend on the availability of other playback devices to perform the verification if the user re-utters the wake word and command. For instance, if there is a third playback device available to determine that the wake word was uttered, the first playback device may forgo performing the command if it does not receive verification form the second playback device. Alternatively, if there are no other playback devices available, the first playback device may perform the command without receiving any verification that the wake word was uttered.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
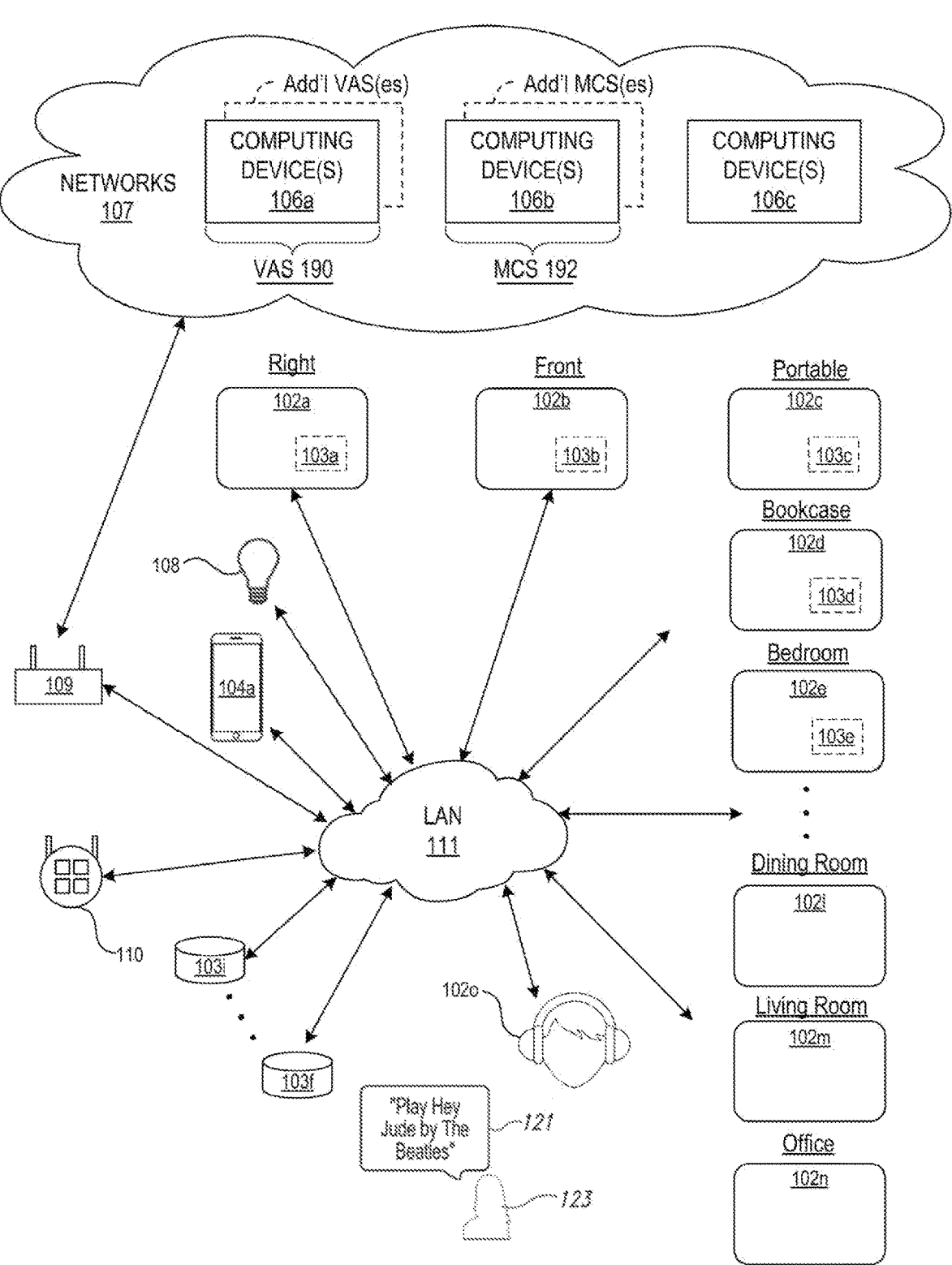
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback device zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a LAN 111 including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the LAN 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase"

to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the LAN 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application Ser. No. 15/438,749.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the LAN 111 (FIG. 1B) may be eliminated and the single playback device 102 and/or the single NMD 103 may communicate directly with the remote computing devices 106a-d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
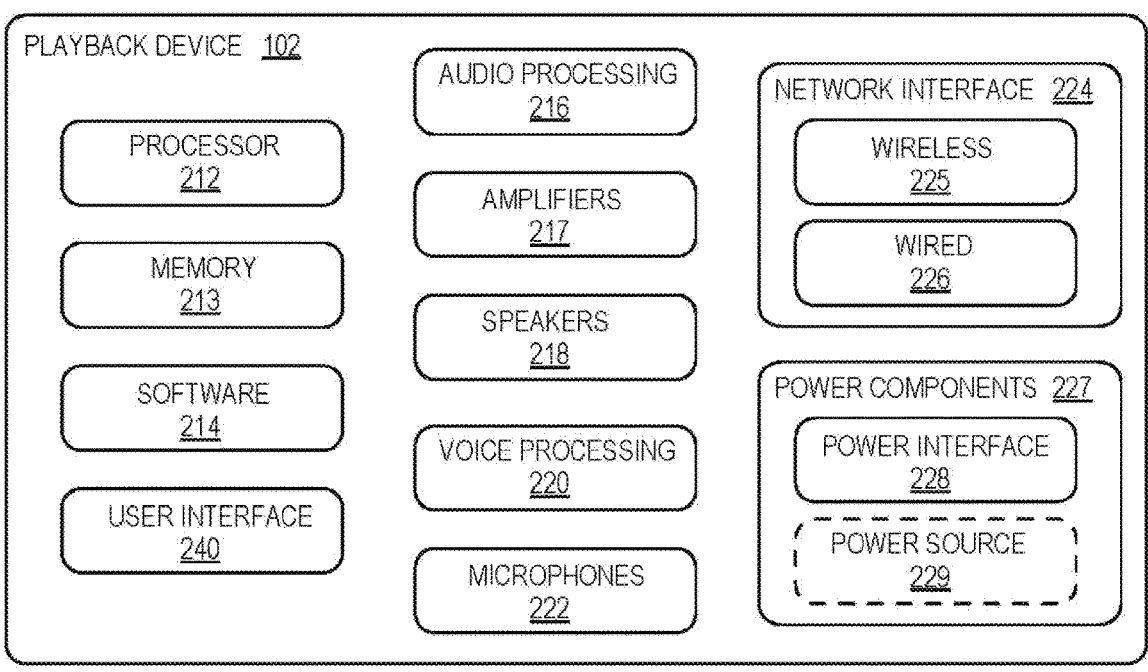
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004 and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously referenced U.S. patent application Ser. No. 15/438,749.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
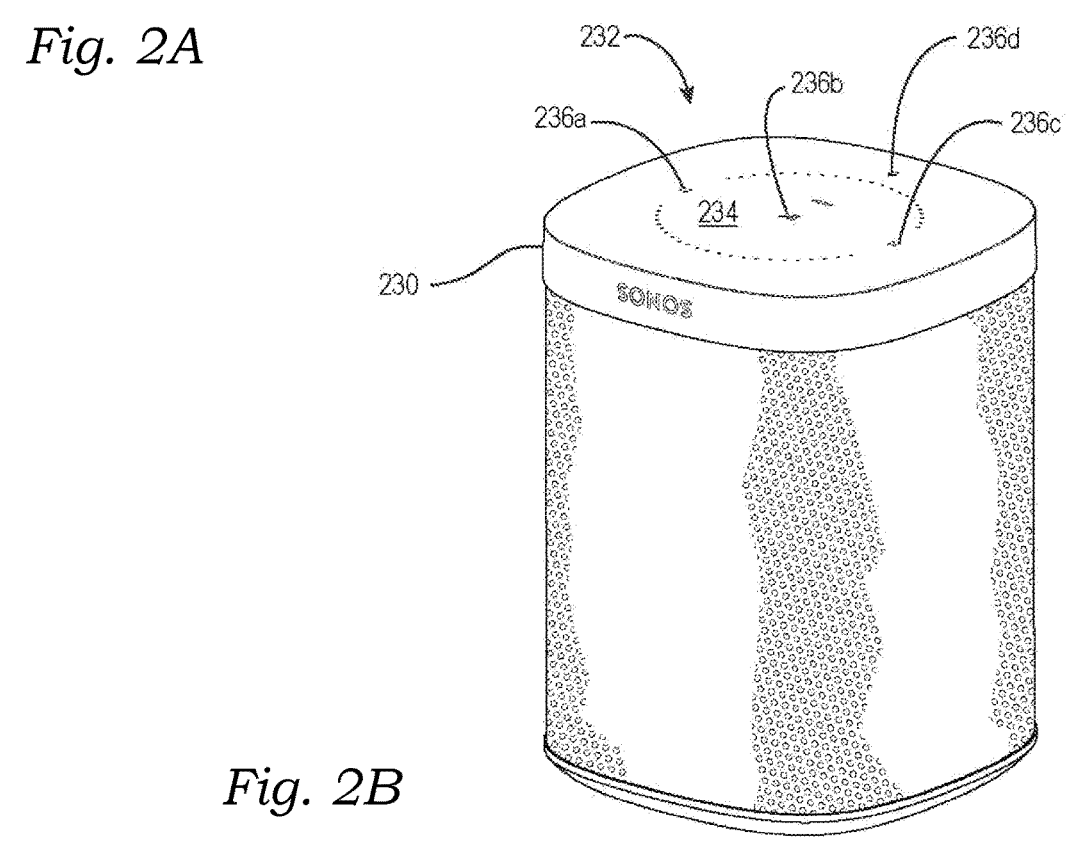
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the media playback system 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figures 3A, 3B, 3C, 3D, 3E:
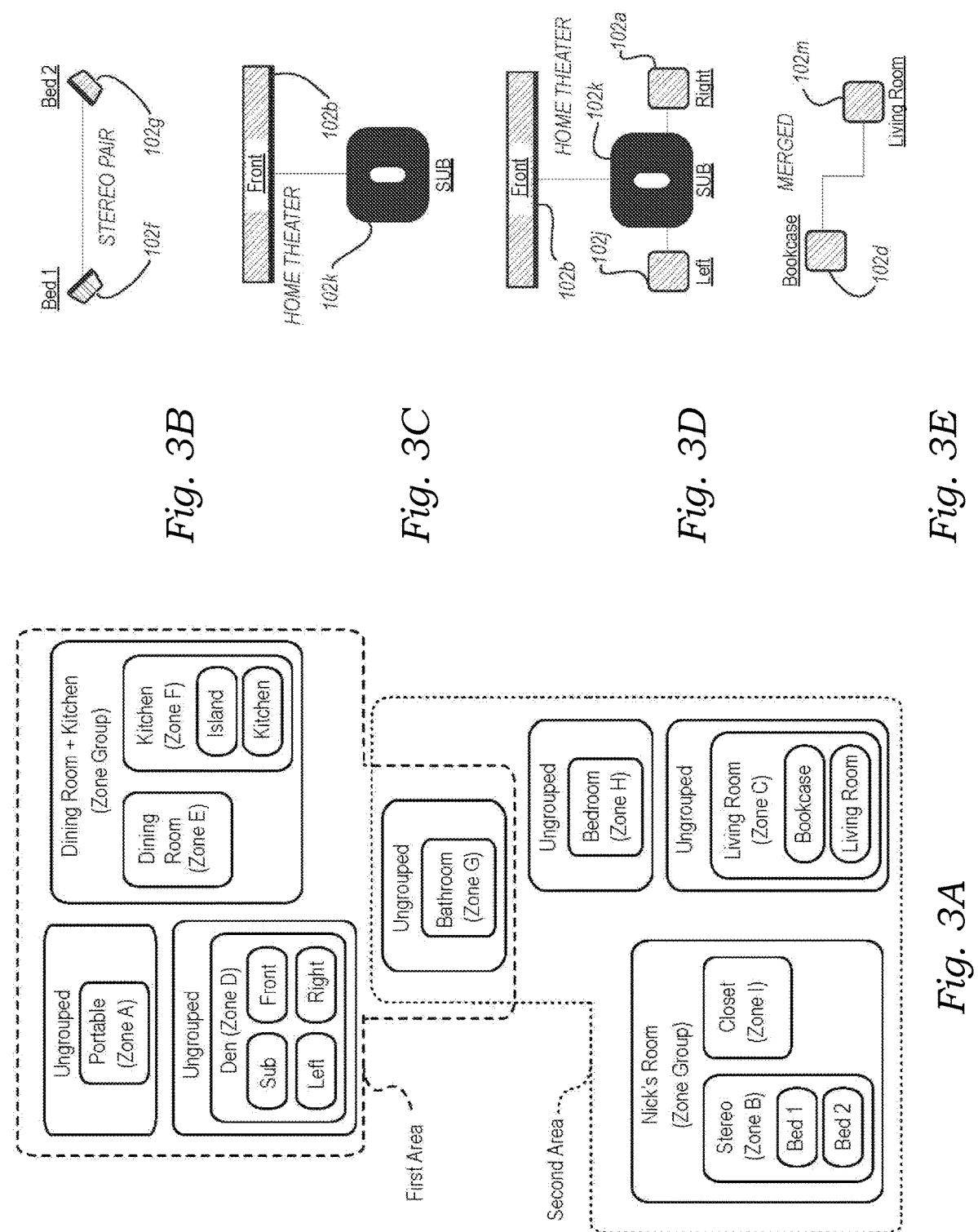
FIGS. 3A-3E are diagrams showing example playback device configurations in accordance with aspects of the disclosure.

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiment's audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

e. Example Network Microphone Devices

Figure 5:
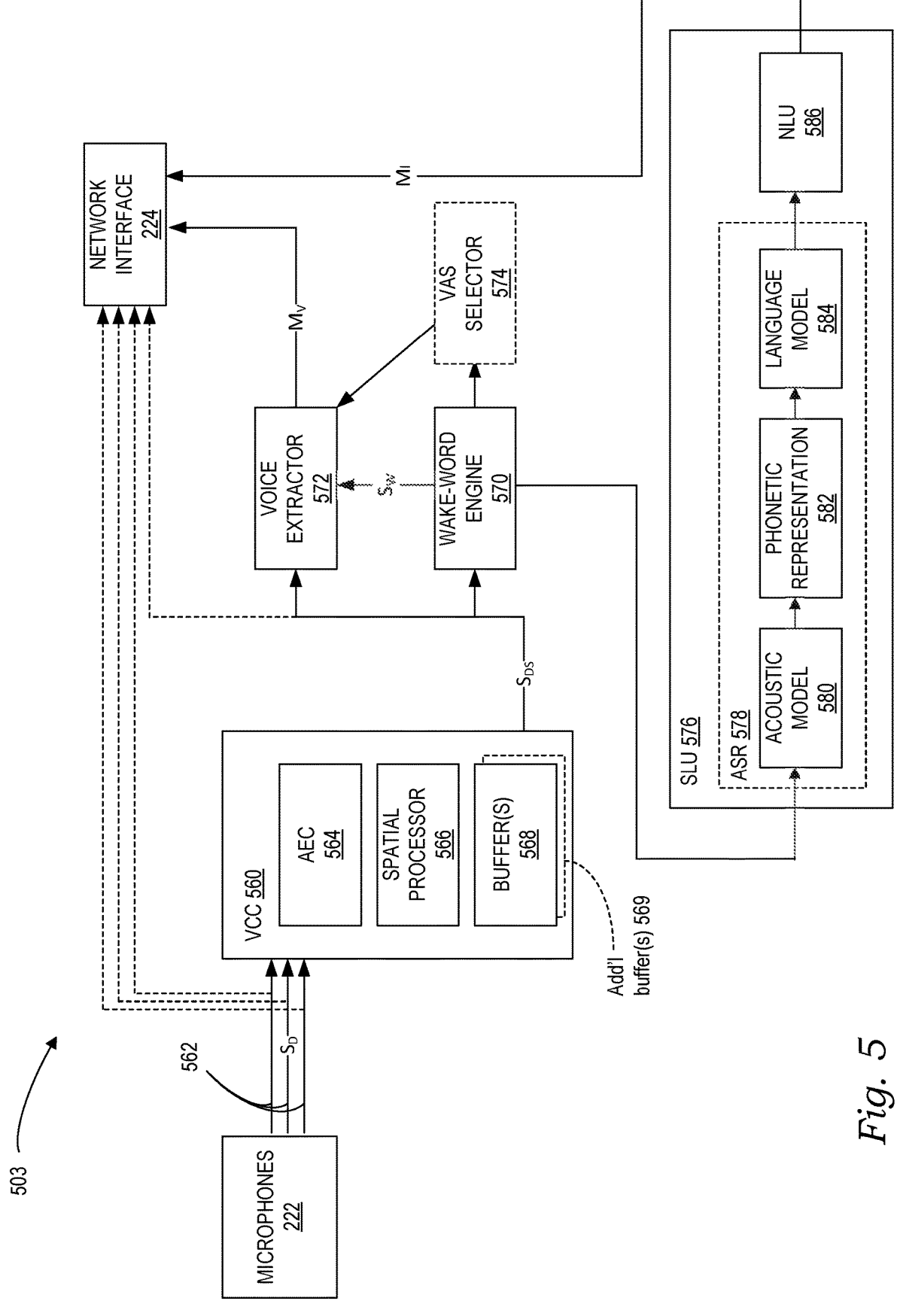
FIG. 5 is a functional block diagram of certain components of an example network microphone device in accordance with aspects of the disclosure.

FIG. 5 is a functional block diagram showing an NMD 503 configured in accordance with embodiments of the disclosure. The NMD 503 includes voice capture components ("VCC") 560, at least one wake-word engine 570 and voice extractor 572, each of which is operably coupled to the VCC 560, and a Spoken Language Understanding (SLU) Unit 576. The NMD 503 further includes the microphones 222 and the at least one network interface 224 described above and may also include other components, such as speakers, audio amplifiers, a user interface, etc., which are not shown in FIG. 5 for purposes of clarity.

The microphones 222 of the NMD 503 are configured to provide detected sound, $S_D$, from the environment of the NMD 503 to the VCC 560. The detected sound $S_D$ may take the form of one or more analog or digital signals. In example implementations, the detected sound $S_D$ may be composed of a plurality signals associated with respective channels 562 that are fed to the VCC 560.

Each channel 562 may correspond to a particular microphone 222. For example, an NMD having six microphones may have six corresponding channels. Each channel of the detected sound $S_D$ may bear certain similarities to the other channels but may differ in certain regards, which may be due to the position of the given channel's corresponding microphone relative to the microphones of other channels. For example, one or more of the channels of the detected sound $S_D$ may have a greater signal to noise ratio ("SNR") of speech to background noise than other channels.

As further shown in FIG. 5, the VCC 560 includes an AEC 564, a spatial processor 566, and one or more buffers 568. In operation, the AEC 564 receives the detected sound $S_D$ and filters or otherwise processes the sound to suppress echoes and/or to otherwise improve the quality of the detected sound $S_D$. That processed sound may then be passed to the spatial processor 566.

The spatial processor 566 is typically configured to analyze the detected sound $S_D$ and identify certain characteristics, such as a sound's amplitude (e.g., decibel level), frequency spectrum, directionality, etc. In one respect, the spatial processor 566 may help filter or suppress ambient noise in the detected sound $S_D$ from potential user speech based on similarities and differences in the constituent channels 562 of the detected sound $S_D$, as discussed above. As one possibility, the spatial processor 566 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 566 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 568—one or more of which may be part of or separate from the memory 213 (FIG. 2A)—capture data corresponding to the detected sound S_D. More specifically, the one or more buffers 568 capture detected-sound data that was processed by the upstream AEC 564 and spatial processor 566.

In some implementations, the NMD 503 may include an additional buffer 569 (shown in dashed lines) that stores information (e.g., metadata or the like) regarding the detected sound S_D that was processed by the upstream AEC 564 and spatial processor 566. This other buffer 569 may be referred to as a "sound metadata buffer." When the wake-word engine 570 identifies a wake-word trigger (discussed below), the sound metadata buffer 569 may pass to the network interface 224 sound characteristic information corresponding to the wake-word trigger (e.g., spectral and/or gain information of sound from the environment of the NMD and/or the voice input comprising the wake word). The network interface 224 may then provide this information to a remote server that may be associated with the MPS 100. In one aspect, the information stored in the additional buffer 569 does not reveal the content of any speech but instead is indicative of certain unique features of the detected sound itself. In a related aspect, the information may be communicated between computing devices, such as the various computing devices of the MPS 100. In some implementations, this may reduce the likelihood of implicating privacy concerns that may arise if the sound characteristic information is provided to a device that is remote from the MPS 100. In practice, the MPS 100 can use this information to adapt and fine-tune voice processing algorithms, including sensitivity tuning as discussed below.

In any event, the detected-sound data form a digital representation (i.e., sound-data stream), S_{DS}, of the sound detected by the microphones 222. In practice, the sound-data stream S_{DS} may take a variety of forms. As one possibility, the sound-data stream S_{DS} may be composed of frames, each of which may include one or more sound samples. The frames may be streamed (i.e., read out) from the one or more buffers 568 for further processing by downstream components, such as the wake-word engine 570, the voice extractor 572, and the SLU 576 of the NMD 503.

In some implementations, at least one buffer 568 captures detected-sound data utilizing a sliding window approach in which a given amount (i.e., a given window) of the most recently captured detected-sound data is retained in the at least one buffer 568 while older detected-sound data are overwritten when they fall outside of the window. For example, at least one buffer 568 may temporarily retain 20 frames of a sound specimen at given time, discard the oldest frame after an expiration time, and then capture a new frame, which is added to the 19 prior frames of the sound specimen.

In practice, when the sound-data stream S_{DS} is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some embodiments, a frame may include a portion of sound (e.g., one or more samples of a given sound specimen) and metadata regarding the portion of sound. In other embodiments, a frame may only include a portion of sound (e.g., one or more samples of a given sound specimen) or metadata regarding a portion of sound.

In any case, downstream components of the NMD 503 may process the sound-data stream S_{DS}. For instance, the wake-word engine 570 is configured to apply one or more identification algorithms to the sound-data stream S_{DS} (e.g., streamed sound frames) to spot potential wake words in the detected-sound S_D. When the wake-word engine 570 spots a potential wake word, the work-word engine 570 provides an indication of a "wake-word event" (also referred to as a "wake-word trigger").

Figure 6:
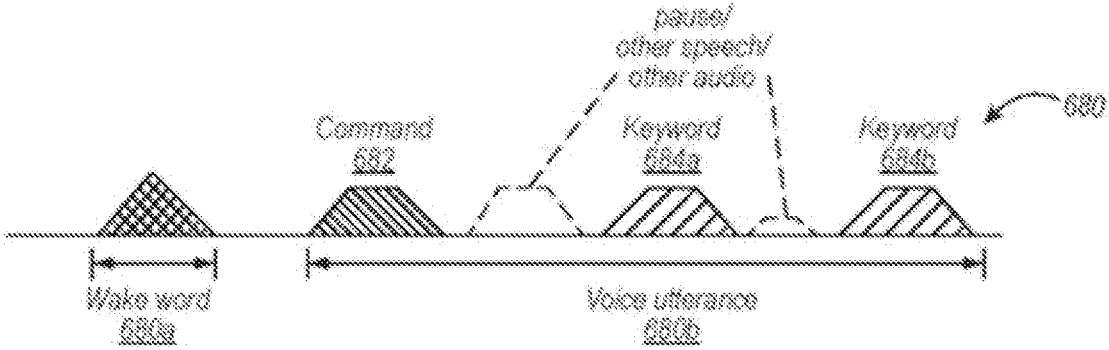
FIG. 6 is a diagram of an example voice input in accordance with aspects of the disclosure.

FIG. 6 provides an illustration of how the wake-word engine 570 may spot potential wake words in the detected-sound S_D. As shown in FIG. 6, a voice input 680 generally includes a wake-word portion 680a and an utterance portion 680b. The wake-word portion 680a corresponds to detected sound that caused the wake-word event. For instance, the wake-word portion 680a corresponds to detected sound that caused the wake-word engine 570 to output the wake-word event signal S_W to the voice extractor 572. The utterance portion 680b corresponds to detected sound that potentially comprises a user request following the wake-word portion 680a.

Further, the utterance portion 680b may include a command 682, and keywords 684a and 684b that are separated by a pause, other speech, or other audio. Once the wake-word portion 680a is determined by the wake-word engine 570, the wake-word engine 570 may send the utterance portion 680b to the SLU 576 to determine the command 682 and keywords 684a and 684b.

Figure 8:
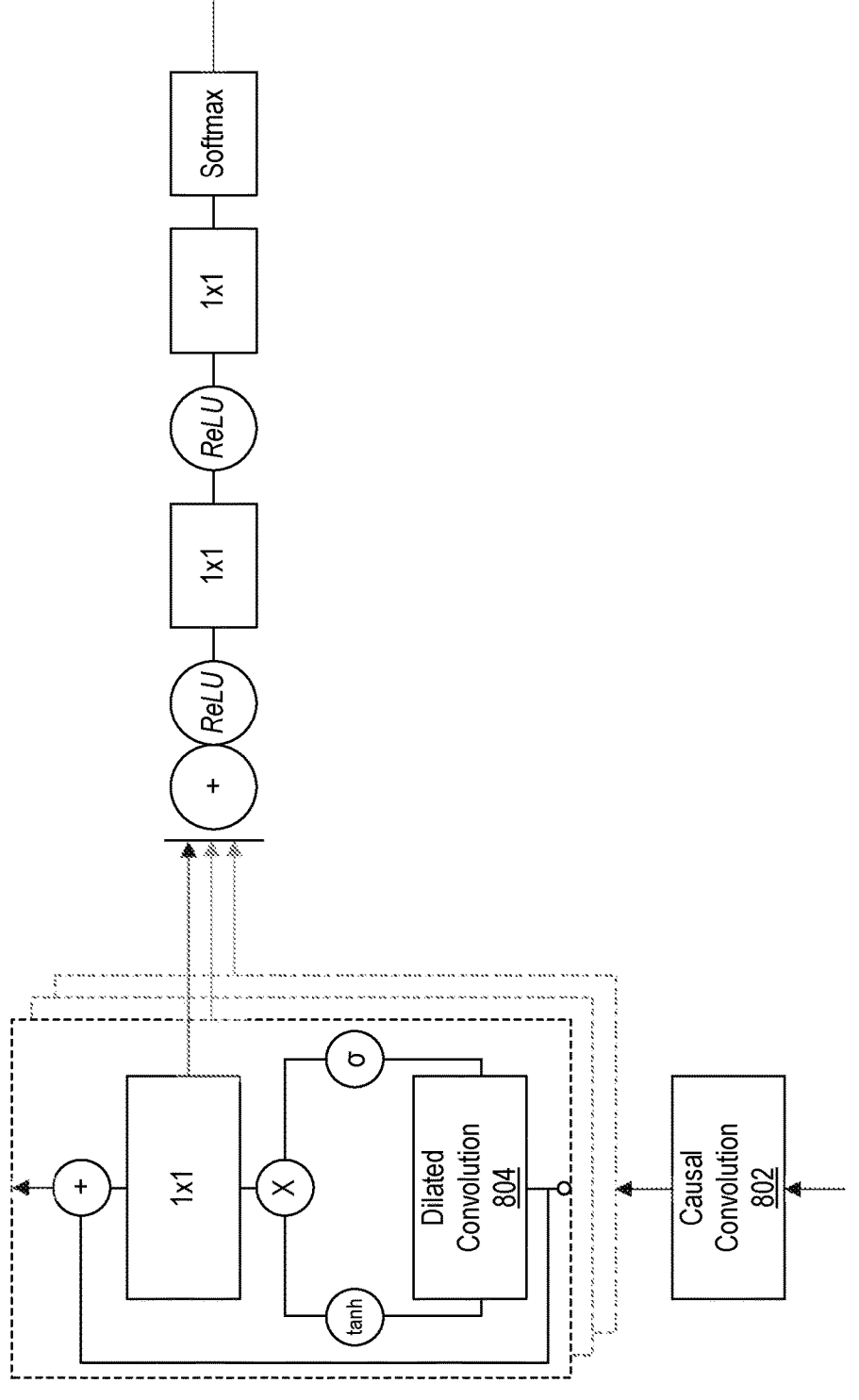
FIG. 8 is a functional block diagram of certain components of a WaveNet Architecture in accordance with aspects of the disclosure.

The wake-word engine 570 may determine the wake-word portion 680a using one or more neural networks pre-loaded onto the wake-word engine 570. The neural network may include a pre-trained neural network that is configured to receive as input the sound-data stream S_{DS} received from the VCC 560. The neural network may take various forms. In one example, the neural network may include a hybrid wavelet and neural network (WaveNet) architecture that utilizes a causal convolution layer, a dilated convolution layer, gated activation units, and residual block and skip connections to provide a relatively light weight neural network architecture. An example WaveNet architecture 800 is provided in FIG. 8. As shown in FIG. 8, The WaveNet architecture 800 receives as input the sound-data stream S_{DS} into the causal convolution layer 802. The output of the causal convolution layer 802 is received by the dilated convolution layer 804.

Figure 9:
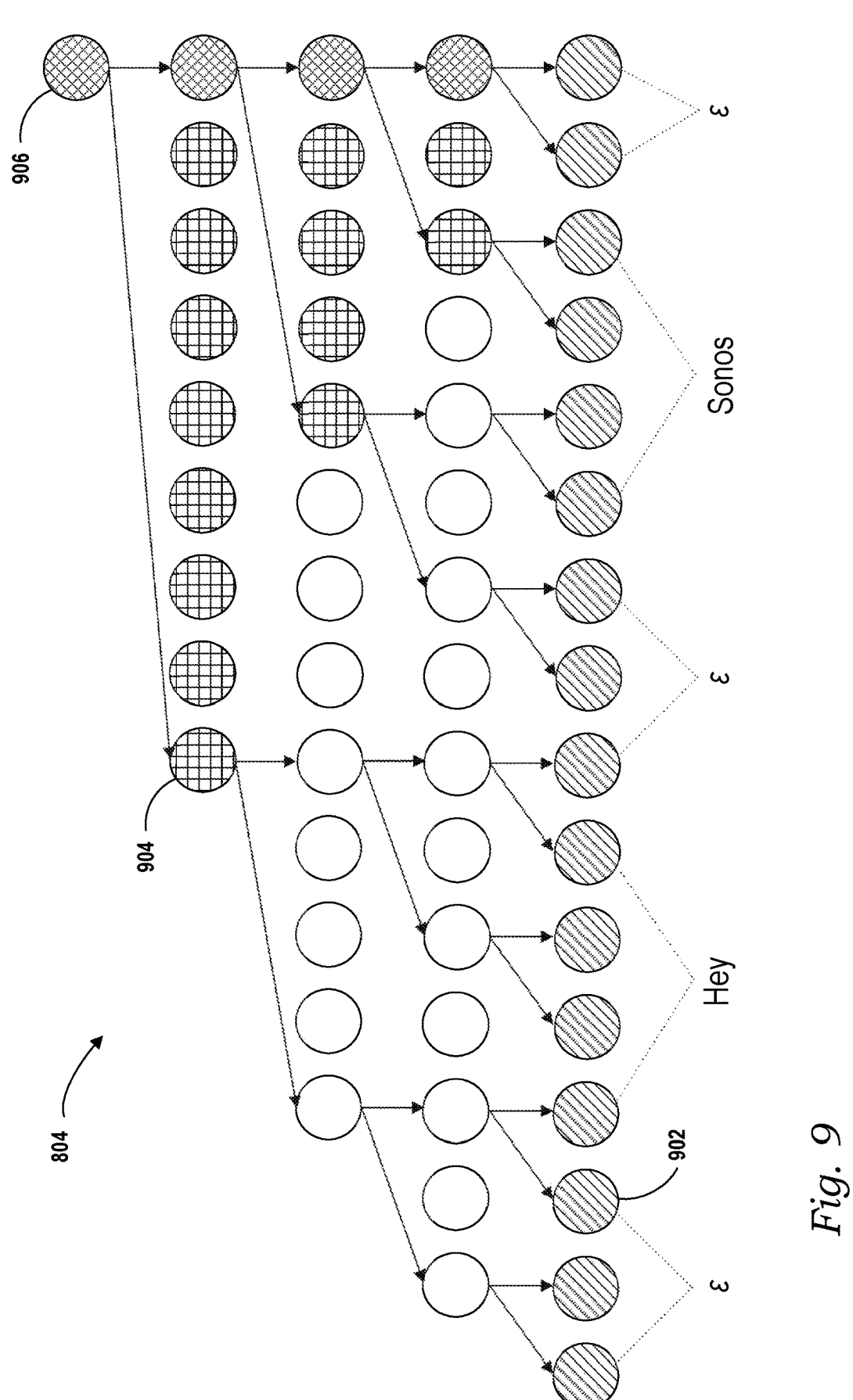
FIG. 9 illustrates an example of a dilated convolutional neural network in accordance with aspects of the disclosure.

The dilated convolution layer 804 allows the network to operate on a lower level of granularity than a normal convolution, such as causal convolution layer 802. In turn, the use of the dilated convolution layer 804 reduces the size and computing requirements of the neural network. One example of a dilated convolution layer 804 is provided in FIG. 9. As shown in FIG. 9, the dilated convolution layer 804 includes a number of nodes with an exponential dilation rate of 1, 2, 4, 8, and a filter size of 2. The diagonal shaded nodes 902 are the input frame vectors that correspond to the sound-data stream S_{DS}. The vertical and horizontally shaded nodes 904 are cached intermediate vectors used for streaming interference, and the cross diagonal shaded nodes are output vectors that are computed. The dilated convolution layer 804 can be adjusted to further reduce the size and computing requirements by reducing the number of dilations or skip connections.

Additional details and examples of the WaveNet architecture, including dilated convolution layers, can be found in Alice Coucke, et. al., "Efficient Keyword Spotting Using Dilated Convolutions and Gating," available at https://arxiv.org/pdf/1811.07684.pdf, which is hereby incorporated by reference in its entirety.

Figure 10:
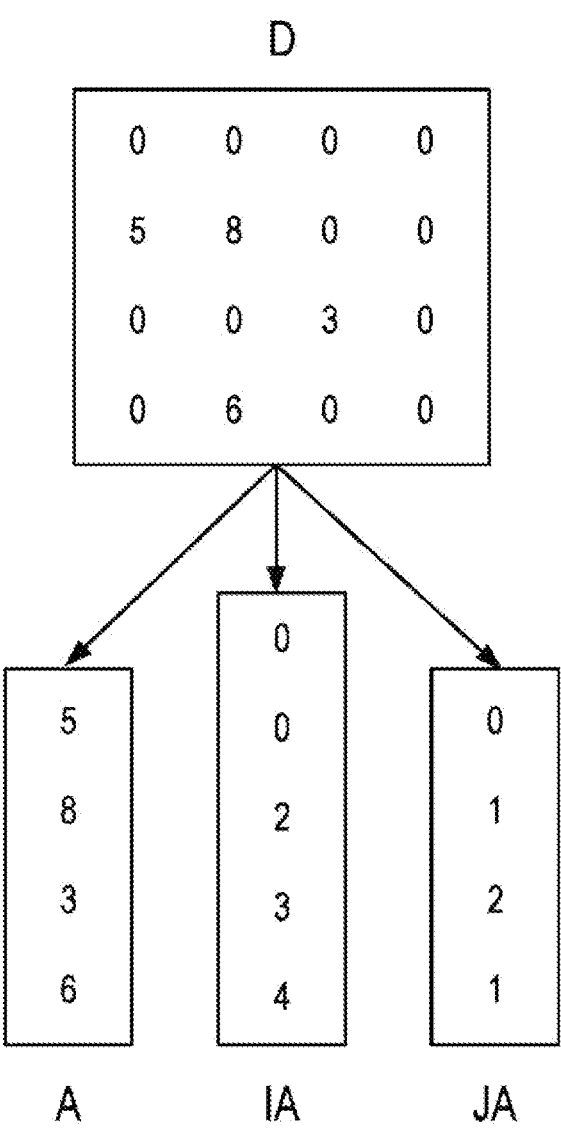
FIG. 10 illustrates an example of compressed sparse row representation of a neural network model in accordance with aspects of the disclosure.

In another example, the neural network used by the wake-word engine 570 shown in FIG. 5 may be implemented as a compressed sparse row (CSR) neural network model. Now referring to FIG. 10, a standard CSR representation is shown, in which a matrix M is represented by three one-dimensional arrays. In particular, in reference to FIG. 10, a matrix D can be represented by three one-dimensional arrays A, IA, and JA. Array A is obtained by taking the nonzero components (5, 8, 3, and 6) of matrix D. Array IA is obtained from the number of nonzero components in each row of matrix D, recursively, with an additional first value of 0. In matrix D, the number of nonzero components in each row is 0, 2, 1, and 1, respectively. Adding these recursively provides values of 0, 2 (0+2), 3 (2+1), and 4 (3+1), as reflected in array IA. Finally, array JA is generated from the column index of each nonzero value in matrix D. For example, the first nonzero value (5) is in column 0, the second nonzero value (8) is in column 1, the third nonzero value (3) is in column 2, and the fourth nonzero value (6) is in column 1. Accordingly, the array JA includes the values 0, 1, 2, 1. These three arrays can represent the matrix M in a compressed format, for example, by reducing the total number of values that need to be stored to represent the neural network model. In the example of FIG. 10, matrix M has 16 values, while the three arrays A, IA, and JA have a combined total of 13 values.

Each of these arrays can be further optimized. For example, the largest number in array IA is the total number of nonzero elements in D, hence the numbers in IA can be stored with lower precision. Array A can be optimized by quantizing with a codebook to indexes. And array JA can be optimized with lower precision indexes and/or to store differences. Additional details and examples of the CSR neural network model can be found in U.S. patent application Ser. No. 16/145,275, filed Sep. 28, 2018, titled "Systems and Methods for Selective Wake Word Detection Using Neural Networks," which is hereby incorporated by reference in its entirety.

Both the WaveNet and CSR representations of the neural network are relatively light-weight and able to be implemented on NMD 503 without significant processing demand. This is beneficial as they allow NMD 503 to determine a command associated with the sound-data stream $S_{DS}$ locally, without having to send it to a VAS for processing. The neural network may take various other forms as well.

Returning to FIG. 5, in general, a particular wake-word engine, such as the wake-word engine 570, may apply one or more identification algorithms, which may include one or more of the neural networks described above, to analyze certain characteristics of the detected sound stream $S_{DS}$ and compare those characteristics to corresponding characteristics of the particular wake-word engine's one or more particular wake words. For example, a particular wake-word engine 570 may apply one or more identification algorithms to spot spectral characteristics in the detected sound stream $S_{DS}$ that match the spectral characteristics of the engine's one or more wake words, and thereby determine that the detected sound $S_D$ comprises a voice input including a particular wake word.

In some implementations, the one or more identification algorithms may be third-party identification algorithms (i.e., developed by a company other than the company that provides the NMD 503). For instance, operators of a voice service (e.g., AMAZON) may make their respective algorithms (e.g., identification algorithms corresponding to AMAZON's ALEXA) available for use in third-party devices (e.g., NMDs 103), which are then trained to identify one or more wake words for the particular voice service. Additionally, or alternatively, the one or more identification algorithms may be first-party identification algorithms that are developed and trained to identify certain wake words that may not be particular to a given voice service. Other possibilities also exist.

In practice, a wake-word engine may include a sensitivity level setting that is modifiable. The sensitivity level may define a degree of similarity between a word identified in the detected sound stream $S_{DS}$ and the wake-word engine 570's one or more particular wake words that is considered to be a match. In other words, the sensitivity level defines how closely, as one example, the spectral characteristics in the detected sound stream $S_{DS}$ must match the spectral characteristics of the engine's one or more wake words to be a wake-word trigger.

In this respect, the sensitivity level generally controls how many false positives that the wake-word engine 570 identifies. For example, if a wake-word engine 570 is configured to identify the wake-word "Alexa" with a relatively high sensitivity, then false wake words of "Election" or "Lexus" may cause the wake-word engine 570 to flag the presence of the wake-word "Alexa." On the other hand, if this example wake-word engine 570 is configured with a relatively low sensitivity, then the false wake words of "Election" or "Lexus" would be less likely to cause the wake-word engine 570 to flag the presence of the wake-word "Alexa."

In practice, a sensitivity level may take a variety of forms. In example implementations, a sensitivity level takes the form of a confidence threshold that defines a minimum confidence (i.e., probability) level for a wake-word engine that serves as a dividing line between triggering or not triggering a wake-word event when the wake-word engine is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a wake-word engine's confidence threshold configures it to trigger a wake-word event when it identifies words that have a lower likelihood that they are the actual particular wake word, whereas raising the confidence threshold configures the engine to trigger a wake-word event when it identifies words that have a higher likelihood that they are the actual particular wake word. Other examples of sensitivity levels are also possible.

In example implementations, sensitivity level parameters (e.g., the range of sensitivities) for a particular wake-word engine can be updated, which may occur in a variety of manners. As one possibility, a VAS or other third-party provider of a given wake-word engine may provide to the NMD 503 a wake-word engine update that modifies one or more sensitivity level parameters for the given wake-word engine.

As another possibility, a remote server associated with the MPS 100 may update (or define in the first instance) sensitivity level parameters for a given wake-word engine, which it may do periodically or aperiodically. In some such cases, the remote server may define or otherwise update sensitivity level parameters for wake-word engines based on data regarding characteristics of detected sound (e.g., spectral and/or gain characteristics) associated with past occurrences of wake-word triggers (i.e., identifications of the respective particular wake-words for the given engines). In practice, the remote server may receive such data from NMDs when wake-word triggers occur or from another source of wake-word related sound data (e.g., Internet databases or the like). In any case, the remote server may be configured to perform operations based on such data (e.g., train predictive models and/or run simulations) to determine sensitivity parameters for a given wake-word engine to balance false positives and true identifications of the particular wake word.

In example embodiments, a wake-word engine 570 may take a variety of forms. For example, a wake-word engine 570 may take the form of one or more modules that are stored in memory of the NMD 503 (e.g., the memory 213 of FIG. 2A). As another example, a wake-word engine 570 may take the form of a general-purpose or special-purpose processor, or a module thereof. In this respect, multiple wake-word engines 570 may be part of the same component of the NMD 503 or each wake-word engine may take the form of a component that is dedicated for the particular wake-word engine. Other possibilities also exist.

In multi-VAS implementations, the NMD 503 may include a VAS selector 574 (shown in dashed lines) that is generally configured to direct the voice extractor's extraction and transmission of the sound-data stream $S_{DS}$ to the appropriate VAS when a given wake-word is identified by a particular wake-word engine (and a corresponding wake-word trigger), such as the wake-word engine 570. In such implementations, the NMD 503 may include multiple, different wake-word engines and/or voice extractors, each supported by a particular VAS. Similar to the discussion above, each wake-word engine may be configured to receive as input the sound-data stream $S_{DS}$ from the one or more buffers 568 and apply identification algorithms to cause a wake-word trigger for the appropriate VAS. Thus, as one example, the wake-word engine 570 may be configured to identify the wake word "Alexa" and cause the NMD 503 to invoke the AMAZON VAS when "Alexa" is spotted. As another example, the wake-word engine 570 may be configured to identify the wake word "Ok, Google" and cause the NMD 503 to invoke the GOOGLE VAS when "Ok, Google" is spotted. In single-VAS implementations, the VAS selector 574 may be omitted.

In some examples, in response to the wake-word event (e.g., in response to the signal $S_W$ indicating the wake-word event), the voice extractor 572 is configured to receive and format (e.g., packetize) the sound-data stream $S_{DS}$. For instance, the voice extractor 572 packetizes the frames of the sound-data stream $S_{DS}$ into messages. The voice extractor 572 transmits or streams these messages, $M_V$, that may contain voice input in real time or near real time to a VAS 190 via the network interface 224 . . . . In other examples, in response to the wake-word event, the wake-word engine 570 sends the sound-data stream $S_{DS}$ to the SLU 576 for intent processing.

The SLU 576 is configured to process the sound-data stream $S_{DS}$ sent by the wake-word engine 570. More specifically, the SLU 576 is configured to identify an intent associated with the sound-data stream $S_{DS}$. The SLU 576 may include an ASR Unit 578 that contains an acoustic model 580, a phonetic representation 582, and a language model 584. The SLU 576 may also include a Natural Language Understanding (NLU) Unit 586.

The acoustic model 580 may be responsible for converting the received sound-data stream $S_{DS}$ into the phonetic representation 582. The acoustic model 580 may accomplish this by employing a hybrid neural network and Hidden Markov Model (HMM) that is trained on hundreds to thousands of hours of audio data. The neural networks used in the acoustic model 680 may include neural networks that include time delay neural network layers and long short-term memory with projection layers. Once this hybrid neural network and HMM architecture is applied to the sound-data stream $S_{DS}$, the acoustic model 180 outputs the phonetic representation 582.

The phonetic representation 582 may represent the sound-data stream $S_{DS}$ as phonemes. These can be interpreted as phone probabilities (i.e., context-dependent clustered HMM state probabilities) that are output from the acoustic model 580. In operation, an utterance such as "Turn on the lights in the living room" may have a phonetic representation 580 such as "t ɜ r n ɑ n ð ə a ɪ t s ɪ n ð ə 'ʒ ɪ v ɪ ŋ r u m" once the acoustic model 580 is applied. This phonetic representation 580 may then be used as input to the language model 584.

The language model 584 may be configured to map the phonetic representation 582 to likely word sequences. The language model 584 accomplishes this by applying a decoding graph to the phonetic representation 582. In some examples, the decoding graph is made up of four weighted Finite State Transducers (wFST). In operation, the language model 584 output may be used by the NLU 586.

The NLU 586 then parses the output of the language model 584 to determine an intent associated with the sentence, as well as any slots associated with the intent. For instance, if a user utters "Hey, Alexa, turn on the bedroom lights," the NLU 586 may determine that the intent is to adjust a state of the lights to "on" in the room "bedroom." In this example, the intent is to switch the lights on, and the associated slot is the bedroom. To assist in this endeavor, the NLU 586 takes into account the probability of co-occurrence of words. For instance, a user may say either "on" or "off" in conjunction with the verb "turn." The NLU 586 may also be specialized to the media playback system environment by restricting its vocabulary as well as the variety of queries it models. For example, the NLU 586 may have a vocabulary of possible intents that is restricted to media transport controls such as play/pause, volume controls, and controls for grouping playback devices for synchronous playback of media, as some examples. Similarly, the NLU 586 may have a vocabulary of slots that is limited to identifying a media service provider, or a particular playback zone within the media playback system, as some examples. This restriction may greatly reduce the processing time and resource requirements of the NMD 503.

Additional details and examples of the SLU techniques, including further discussion of ASR and NLU can be found in Alice Coucke, et. al., "Snips Voice Platform: an embedded Spoken Language Understanding system for private-by-design voice interfaces," available at https://arxiv.org/pdf/1805.10190.pdf, which is hereby incorporated by reference in its entirety.

Referring back to FIG. 5, after applying ASR to the sound-data stream $S_{DS}$, the SLU 576 may output the intent (e.g., command) and slots associated to the sound-data stream $S_{DS}$ as messages MI to the VAS via network interface 224. In turn, the VAS may cause the intent to be executed.

III. Example Localized Wake-Word Verification

As discussed above with reference to FIG. 5, the NMD 503 includes wake-word engine(s) 570, which is configured to apply one or more identification algorithms or neural networks to received sound inputs to identify whether that sound comprises a voice input that includes a particular wake word for the given wake-word engine. If one of the wake-word engines identifies the presence of a wake word, then the wake-word engine triggers the voice extractor 572 and SLU 576 to perform voice-capture related functions to obtain an intent of the sound-data stream $S_{DS}$.

As noted above, an NMD may expend a significant amount of compute resources when its wake-word engine is active (i.e., processing detected sound). Likewise, an NMD may expend additional computing resources when performing voice-capture related functions upon the wake-word engine identifying a wake word. Because of the computationally intensive nature of these functions, it may be desirable for the identification algorithm or neural network used by the wake-word engine to detect the wake word to be relatively light-weight. However, this makes the wake-word engine prone to detecting false positives. These false positives can occur in a variety of manners.

For example, a false positive can occur when the wake-word engine 570 identifies, in detected sound that originates from audio output by the NMD 503 itself or a playback device in the vicinity of the NMD 503, a wake word that the engine is trained to spot. This scenario is considered a false positive—and the wake word in the audio is considered a false wake word—because the source of the wake word is the NMD 503 itself, or the nearby playback device, instead of a person speaking with the intention of invoking the voice service associated with the wake word. In this respect, as one example, when the audio of a commercial advertising AMA-ZON's ALEXA service is output in the vicinity of the NMD 503 with the wake-word engine 570 trained to spot "Alexa," the word "Alexa" spoken in the commercial is considered a false wake word.

As another example, a false positive can occur when the wake-word engine 570 identifies, in detected sound that originates from audio output by the NMD 503 itself or a playback device in the vicinity of the NMD 503, a word that is phonetically similar to an actual wake word that the engine is trained to spot. In this regard, as one example, when the audio of a commercial advertising LEXUS automobiles is output in the vicinity of the NMD 503 with the wake-word engine 570 trained to spot "Alexa," the word "Lexus" spoken in the commercial is considered a false wake word. As another example, when the audio of a TV news coverage of an election is output in the vicinity of the NMD 503 with the wake-word engine 570 trained to spot "Alexa," the word "Election" spoken in that news coverage is considered a false wake word. Other examples of false wake words are also possible.

As discussed before, the occurrences of false positives are undesirable for a number of reasons. For example, an NMD prone to false positives can operate inefficiently in that false wake word triggers cause it to carry out computationally intensive voice-capture related functions. As another example, a false positive may cause an NMD to chime unexpectedly and startle anyone nearby the NMD. As yet another example, a false positive may also interrupt audio playback, which can diminish a listening experience.

As discussed previously, one typical solution is to offload any wake word verification to a VAS that can leverage cloud computing systems with effectively limitless resources. However, this solution presents its own problems. For instance, if the VAS is unavailable due to connection failure, the wake word might not be verified, causing the problems outlined above. Further, sending sound data to a VAS may implicate privacy concerns in some situations, as the VAS has access to the entirety of the user's utterance. In turn, this may deter a user from using some or all of the voice functionality of the NMD.

Example devices, systems, and methods disclosed herein attempt to alleviate the aforementioned technical and privacy challenges. In this regard, broadly speaking, a first playback device (e.g., an NMD 503) is configured to transmit all or part of the received sound data to a second playback device that has more available computing resources to verify a detected wake word. The first playback device is further configured to determine a command (e.g., intent) associated with the received sound data in parallel with the second playback device's verification of the wake word. For purposes of illustration only, an example method 1100 for determining an intent in parallel with verifying a wake word is depicted in FIG. 11 and discussed below as being carried out by a first playback device of the MPS 100 that is NMD-equipped (e.g., the playback device 102a). It should be understood that the method 1100 is exemplary. For instance, one or more blocks shown in the flow diagram of FIG. 11 may be rearranged into different orders, combined into fewer blocks, separated into additional blocks, and/or removed altogether. It should further be understood that the method 1100 could be performed by a device other than a playback device of the MPS 100, which may be part of a different type of system.

In line with the above discussion, and with reference to FIG. 5, the playback device 102a (e.g., first playback device), which is configured with components and functionality of an NMD 503, may include at least one microphone 222, VCC 560, a wake-word engine 570, and a network interface 224. The second playback device may also be NMD-equipped (e.g., the playback device 102b in FIG. 1B), and may also be configured with the same components and functionality of the NMD 503. However, as discussed below, the components of the second playback device may be configured differently than the components of the first playback device. For instance, the wake-word engine 570 of the second playback device may be configured to use a different identification algorithm or neural network to verify the occurrence of the wake word event.

Turning now to FIG. 11, at block 1102, the playback device 102a receives, via the microphones 222, sound data. The sound data may include a continuous stream of sound data, such as sound-data stream $S_{DS}$ discussed above with respect to FIG. 5. The sound data may include an utterance from a user that is intended to cause the playback device 102a to perform an action associated with the utterance. The playback device 102a may, after receiving the sound data, perform signal processing on the sound data via VCC 560. As previously discussed, this signal processing may reduce noise or otherwise make the sound data easier to process by the wake-word engine 570, among other possibilities.

At block 1104, the playback device 102a determines, via the wake-word engine 570, that at least a first portion of the sound data is representative of a wake word. In practice, the wake-word engine 570 may determine that at least a first portion of the sound data is representative of a wake word in various ways.

In one example, the wake-word engine 570 may apply a trained neural network, such as the neural networks discussed above with respect to FIG. 5, to the received sound data to determine whether a wake-word event has occurred. In another example, the wake-word engine 570 may apply an identification algorithm to match the spectral and gain characteristics of the received sound data with a predetermined data set of characteristics associated with the wake word. The playback device 102a may determine that at least a portion of the sound data is representative of the wake word in other ways as well.

At block 1106, the playback device 102a determines that playback device 102b has been added to the media playback system of which playback device 102a is a member. This determination may serve as an indication to playback device 102a that the playback device 102b is available to receive the first portion of the sound data to verify the determination of playback device 102a that the first portion of the sound data is representative of the wake word. This may be particularly beneficial in scenarios where the playback device 102a was previously sending the sound data to a VAS for intent processing.

For instance, the playback device 102a may, when it is the only playback device on a network, utilize a VAS for wake word verification since the playback device 102b has not yet been connected to the media playback device of which the playback device 102a is a member and thus unavailable to verify the wake word. However, when the playback device 102b joins the media playback system or otherwise becomes available to receive the sound data, the playback device 102a may begin utilizing the playback device 102b for wake word verification instead of the VAS.

Figure 7A:
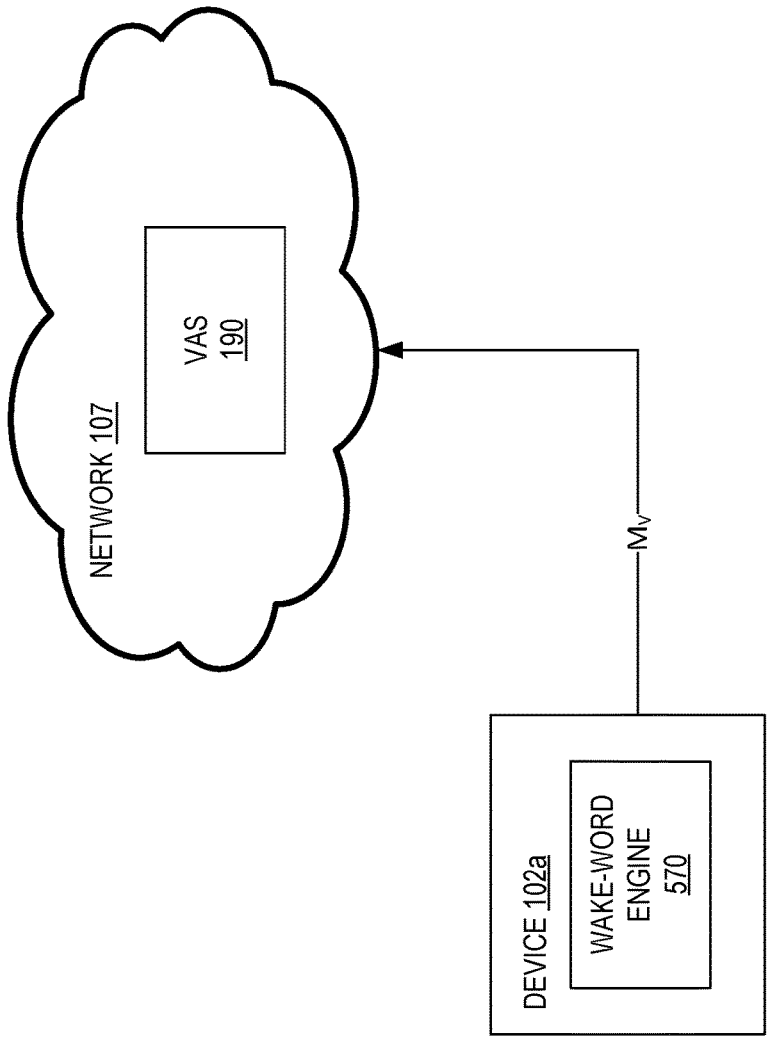
FIG. 7A is a schematic diagram of an example media playback system configuration in accordance with aspects of the disclosure.
Figure 7B:
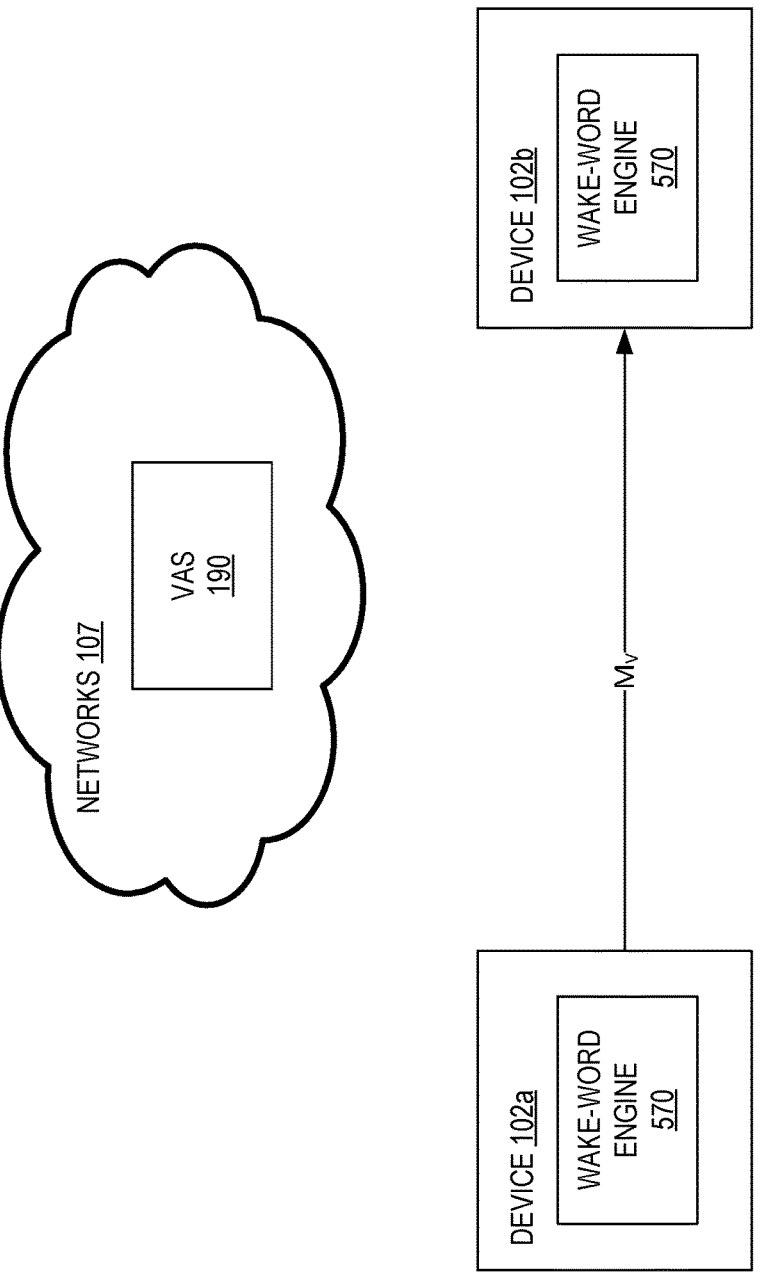
FIG. 7B is a schematic diagram of an example media playback system configuration in accordance with aspects of the disclosure.

To help illustrate the decision made by the playback device 102a of where to send the sound data, FIGS. 7A and 7B depict example schematic diagrams of respective example media playback system configuration.

FIG. 7A depicts a media playback system configuration that includes the playback device 102a and a cloud-based network 107. The playback device 102 may include a wake-word engine 570 and the network may include a VAS 190. In this configuration, once the wake-word engine 570 of the playback device 102a determines that the first portion of the sound data is representative of the wake word, the playback device 102a may send the sound data to the VAS 190 of network 107 to verify that the first portion of the sound data is indeed representative of the wake word and to process the intent of the sound data. This configuration may be, despite having the drawbacks discussed above, the most beneficial solution when the playback device 102a is the only playback device on the network. However, once another playback device is added to the network, the playback device 102a can leverage the computational power of that playback device to verify the wake word.

FIG. 7B depicts the same media playback system configuration in FIG. 7A, but with the addition of the playback device 102b. As shown, the playback device 102b has its own wake-word engine 570. In this configuration, once the wake-word engine 570 of the playback device 102a determines that the first portion of the sound data is representative of the wake word, the playback device 102a may send the sound data to the playback device 102b to verify that the first portion of the sound data is indeed representative of the wake word and to process the intent of the sound data.

In operation, the playback device 102a may switch from sending the sound data from the VAS 190 to the playback device 102b in various scenarios. In one scenario, the playback device 102a may switch from sending the sound data from the VAS 190 to the playback device 102b automatically in response to the addition of the playback device 102b to the media playback system. In another scenario, the playback device 102a may switch from sending the sound data from the VAS 190 to the playback device 102b in response to user input. The user input may take various forms. In one example, the user input may be an update to a privacy setting that indicates that the playback device 102a should prioritize local processing. In another example, the user input may be an indication that the playback device 102a should stop sending voice utterance sound data to any cloud-based systems. The user input may take various other forms as well. The playback device 102a may switch from sending the sound data from the VAS 190 to the playback device 102b in various other scenarios as well.

At block 1108, the playback device 102a, based on determining that the first portion of the sound data is representative of the wake word and that the playback device 102b has been added to the media playback device of which the playback device 102a is a member, transmits the first portion of the sound data to the playback device 102b. In turn, the playback device 102b may seek to verify the accuracy of the playback device 102a's determination that the first portion of the sound data is representative of the wake word. The playback device 102b may verify the accuracy of the determination in various ways, which may be dependent on the form of the sound data transmitted by the playback device 102a.

In one example, the first portion of the sound data may include the entirety of the detected sound $S_D$. In this example, the playback device 102a, upon determining that the first portion of the sound data is representative of the wake word, sends each channel 562 of the sound data $S_D$ to the playback device 102b via network interface 224. In turn, the playback device 102b receives and processes the sound data via its respective VCC 560. In some implementations, the playback device 102b may then perform different signal processing on the received sound data than was performed by the playback device 102a. The different signal processing may include applying additional dereverberation, noise reduction, or more aggressive echo cancellation strategies. The different signal processing may include other techniques as well.

After processing the received sound data, possibly in a different manner than playback device 102a, the playback device 102b may provide the processed sound data to its respective wake-word engine 570. The playback device 102b may then determine that the first portion of the sound data is representative of the wake word by applying the same identification algorithm or neural network used by the playback device 102a in determining that the first portion of the sound data is representative of the wake word. The playback device 102b may additionally determine a confidence threshold that defines a minimum confidence (i.e., probability) level for whether the playback device 102b will send an indication that the first portion of the sound data is representative of the wake word. In this regard, the playback device 102b might send the indication that the first portion of the sound data is representative of the wake word only when the confidence threshold is above the minimum confidence level. The minimum confidence level may be predetermined or dynamically changed based on feedback from the neural network model used to determine whether the first portion of the sound data is representative of the wake word.

In another example, the first portion of the sound data may include the sound-data stream $S_{DS}$. In this example, the playback device 102a, upon determining that the first portion of the sound data is representative of the wake word, sends the processed sound data (e.g., sound-data stream $S_{DS}$) to playback device 102b via network interface 224. In this example, the playback device 102b receives and provides the sound data to its respective wake-word engine 570. The wake-word engine 570 of the playback device 102b may be configured differently than the wake-word engine 570 of the playback device 102a insofar that the wake-word engine 570 of the playback device 102b may employ a different size or weighted neural network to determine that the first portion of the sound data is representative of the wake word, depending on the available resources of the playback device 102b.

In this respect, before sending the sound data to the playback device 102b, the playback device 102a may determine the available resources of the playback device 102b. The playback device 102a may accomplish this by determining whether the playback device 102b is (i) currently playing back audio content, (ii) is configured to perform computationally intensive tasks for the media playback system (e.g., running an NLU stack, etc.). Once the playback device 102a determines that the playback device 102b has available resources, the playback device 102a may select the playback device 102b to verify the wake-word event.

For instance, in some embodiments, the playback device 102a may determine that the playback device 102b may be idle and not currently playing back audio content. In these embodiments, the playback device 102b may have more available resources than the playback device 102a and thus can leverage its available resources to use a larger, more computationally intensive neural network to determine that the first portion of the sound data is representative of the wake word. The configurations of the neural networks used by the respective wake-word engines of the playback device 102a and the playback device 102b may take various forms.

In one example, the playback device 102a may use a relatively light-weight neural network (e.g., a dilated convolutional neural network as described with respect to the WaveNet model in FIG. 8) to determine that the first portion of the sound data is representative of the wake word. In turn, the playback device 102b may use a more computationally intensive neural network, such a dilated convolutional neural network that uses less dilations and fewer skip-connections.

In another example, the playback device 102a may use a CSR representation of a neural network, such as the CSR representation illustrated in FIG. 10, to determine that the first portion of the sound data is representative of the wake word. In turn, the playback device 102b may use a more computationally intensive neural network, such a dilated convolutional neural network that uses less dilations and fewer skip-connections.

In yet another example, the playback device 102a may use a neural network that is weighted differently than the neural network used by the playback device 102b. For instance, if the playback device 102a is using the dilated convolutional neural network described with respect to FIG. 8, the nodes 902, 904, and 906 may have a particular weight associated with them. The weighting of the nodes may depend on the language setting of the playback device 102a (e.g., if the default language is English, the nodes are trained to bias towards an English pronunciations of words). In turn, the playback device 102b may use the same dilated convolutional neural network, but with the nodes biased towards another language (e.g., Spanish, French, German, etc.). Using a neural network biased towards a foreign language may assist in detecting a wake word despite a user's accent, even though the user is speaking words commensurate with the default language of the playback device 102a.

Other combinations of neural networks used by the respective wake-word engines of the playback device 102a and the playback device 102b are possible as well. Further, it should be understood that the respective wake word engines 570 of the playback device 102a and the playback device 102b may have each of the neural networks described above pre-loaded and available for use, depending on the available resources of each of the playback device 102a and the playback device 102b.

The playback device 102b may verify the accuracy of the determination in various other ways as well.

In some embodiments, the playback device 102a may send the first portion of the sound data to additional playback devices instead of just the playback device 102b. In these embodiments, the playback device 102a may send each individual channel 562 of sound data $S_D$ to a respective playback device to determine whether the first portion of the sound data is representative of the wake word. For instance, the playback device 102a may send a first channel of sound data $S_D$ to the playback device 102b, a second channel of sound data $S_D$ to the playback device 102c, and a third channel of sound data $S_D$ to the playback device 102d. Each of the playback devices 102b, 102c, and 102d may then perform signal processing on their respective channel of sound data via their respective wake-word engines to determine whether the first portion of the sound data is representative of the wake word. Each of the playback devices 102b, 102c, and 102d may then, upon determining that the first portion of the sound data is representative of the wake word, send an indication to the playback device 102a that the first portion of the sound data is representative of the wake word. The playback device 102a may receive each indication from each of the playback devices 102b, 102c, and 102d. The playback device 102a may then determine that a threshold number of the indications indicate that the first portion of the sound data is representative of the wake word (e.g., at least two thirds of the received indications indicate that the first portion of the sound data is representative of the wake word). If the playback device 102a determines that the threshold number of indications are met, the playback device 102a may proceed to block 1110.

Returning to FIG. 11, at block 1110, the playback device 102a may begin determining a command, based on at least a second portion of the sound data, to be performed by the playback device 102a. The playback device 102a may determine the command by providing the portion of the sound data not associated with the wake word to the SLU 576, as discussed above with respect to FIG. 5. In turn, the SLU 576 may apply ASR 578 to determine the command.

For example, a user may utter "Hey, Sonos, group my PLAY:1 and PLAY:5." The playback device 102a may have already determined that "Hey, Sonos" was representative of the wake word, and proceed to send the portion of the sound data associated with the remainder of the utterance "group my PLAY:1 and PLAY:5" to the SLU 576. In turn, the SLU 576 may apply the acoustic model 580 to obtain a phonetic representation 582 of the portion of the sound data. The SLU 576 may then use the language model 584 to obtain a text-based sentence representing the phonetic representation 582. Lastly, the SLU 576 may parse, via the NLU 586, the text-based sentence in order to determine the command (e.g., to configure the user's PLAY:1 and PLAY:5 to play back media in synchrony).

In operation, the playback device 102a may begin determining the command while the playback device 102b is verifying the determination that the first portion of the sound data is representative of the wake word. The parallel processing of determining the command and verifying the wake word determination may be particularly beneficial as it reduces the latency in the playback device 102a performing the command. The parallel processing may also be beneficial as it allows the playback device 102b to leverage computing resources that are unavailable to the playback device 102*a*, which in turn leads to more accurate verification of the wake word determination.

At block 1112, the playback device 102*a* may receive, from the playback device 102*b*, an indication of whether the first portion of the sound data is representative of the wake word. The playback device 102*a* may receive the indication from the playback device 102*b* via the network interface 224. In practice, indication of whether the first portion of the sound data is representative of the wake word may be a signal that either verifies, or does not verify, the playback device 102*a*'s determination that the first portion of the sound data is representative of the wake word.

The playback device 102*a* may perform additional actions depending on the received indication of whether the first portion of the sound data is representative of the wake word. In one example, if the indication received from the playback device 102*b* indicates that the first portion of the sound data is not representative of a wake word, the playback device 102*a* may (i) cease determining the command to be performed by the playback device 102*a*, or (ii) if the playback device 102*a* has already completed determining the command to be performed by the playback device 102*a*, forgo executing the command.

In another example, if the indication received form the playback device 102*b* indicates that the first portion of the sound data is representative of the wake word, the playback device 102*a* may (i) complete determining the command to be performed by the playback device 102*a*, and once complete, perform the command, or (ii) if the playback device 102*a* has already completed determining the command to be performed by the playback device 102*a*, perform the command. In this regard, if the playback device 102*a* finishes determining the command prior to receiving an indication from the playback device 102*b*, if may wait until the indication is received before determining whether to forego or execute the command.

At block 1114, the playback device 102*a* may output a response indicative of whether the first portion of the sound data is representative of the wake word. The response indicative of whether the first portion of the sound data is representative of the wake word may take various forms.

In one example, the response may involve the playback device 102*a* emitting, via speakers 216, a tone indicating that the first portion of the sound data is representative of the wake word.

In another example, the response may involve the playback device 102*a* providing a visual response via user interface 240. The visual response may include illuminating an LED to indicate that the first portion of the sound data is representative of the wake word. The visual response may take various forms. For example, the visual response may include a single, brief illumination of the LED. In another example, the visual response may include a prolonged illumination of the LED that remains illuminated until the playback device 102*a* completes performance of the command associated with the second portion of the sound data. The visual response may take other forms as well.

In yet another example, the response may involve the playback device 102*a* transmitting a message to a control device (e.g., control device 104) that causes the control device to display a message to the user indicating that the first portion of the sound data is representative of the wake word.

The response indicative of whether the first portion of the sound data is representative of the wake word make take various other forms as well.

The playback device 102*a* may output the response indicative of whether the first portion of the sound data is representative of the wake word at various times.

In one example, the playback device 102*a* may output the response indicative of whether the first portion of the sound data is representative of the wake word upon the playback device 102*a* determining that the first portion of the sound data is representative of the wake word. In this example, the indication may be a preliminary indication to inform the user that the playback device 102*a* has detected a wake word event and has begun determining an associated command, even though the playback device 102*b* has not yet verified that the first portion of the sound data is representative of the wake word. Further, the playback device 102*a* may output an additional response upon receiving verification of the wake word event from the playback device 102*b*, or cease outputting the preliminary response upon receiving an indication that the first portion of the sound data is not representative of the wake word.

In another example, the playback device 102*a* may output the response indicative of whether the first portion of the sound data is representative of the wake word upon receiving verification from the playback device 102*b* that the first portion of the sound data is indeed representative of the wake word. In this example, the indication may be a final indication that informs the user that the playback device 102*a* and the playback device 102*b* has determined that the first portion of the sound data is representative of the wake word.

The playback device 102*a* may output the response indicative of whether the first portion of the sound data is representative of the wake word at various other stages as well.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples may be combined in any combination and placed into a respective independent example. The other examples can be presented in a similar manner.

Example 1: A first networked microphone device comprising: a network interface; at least one microphone; at least one processor; a wake-word engine configured to receive as input sound data via the at least one microphone; a non-transitory computer-readable medium; and program instructions stored on the non-transitory computer-readable medium that are executable by the at least one processor such that the first networked microphone device is configured to: receive, via the at least one microphone, sound data; determine, via the wake-word engine, that at least a first portion of the sound data is representative of a wake word; determine that a second networked microphone device has been added to a media playback system, wherein the first networked microphone device is a member of the media playback system; based on determining that the first portion of the sound data is representative of the wake word and that the second networked microphone device has been added to the playback system, transmit, via the network interface, the first portion of the sound data to the second networked microphone device; begin determining a command, based on at least a second portion of the sound data, to be performed by the first networked microphone device; receive, from the second networked microphone device, an indication of whether the first portion of the sound data is representative of the wake word; and output a response indicative of whether the first portion of the sound data is representative of the wake word.

Example 2: The first networked microphone device of Example 1, wherein the indication received from the second networked microphone device indicates that the first portion of the sound data is not representative of a wake word, further comprising program instructions stored thereon that are executable by the at least one processor such that the first networked microphone device is configured to: based on receiving the indication that the first portion of the sound data is not representative of the wake word, cease determining the command to be performed by the first networked microphone device.

Example 3: The first networked microphone device of Example 1, wherein the indication received from the second networked microphone device indicates that the first portion of the sound data is not representative of a wake word, further comprising program instructions stored thereon that are executable by the at least one processor such that the first networked microphone device is configured to: determine the command, based on the second portion of the sound data, to be performed by the first networked microphone device; and based on the indication that the first portion of the sound data is not representative of the wake word, forego performing the command.

Example 4: The first networked microphone device of Example 1, wherein the indication received from the second networked microphone device indicates that the first portion of the sound data is not representative of a wake word, further comprising program instructions stored thereon that are executable by the at least one processor such that the first networked microphone device is configured to: determine the command to be performed by the first networked microphone device; and based on the indication that the first portion of the sound data is representative of the wake word, perform the command.

Example 5: The first networked microphone device of Example 1, wherein the program instructions that are executable by the at least one processor such that the first networked microphone device is configured to determine that the first portion of the sound data is representative of the wake word comprise program instructions that are executable by the at least one processor such that the first networked microphone device is configured to use a first neural network, wherein the first neural network is pre-loaded on the wake-word engine.

Example 6: The first networked microphone device of Example 5, further comprising program instructions stored thereon that are executable by the at least one processor such that the first networked microphone device is configured to: after transmitting the first portion of the sound data to the second networked microphone device, cause the second networked microphone device to use a second neural network to determine whether the first portion of the sound data is representative of the wake word.

Example 7: The first networked microphone device of Example 6, wherein the wake-word engine is a first wake-word engine, and wherein the second neural network is pre-loaded on a second wake-word engine on the second networked microphone device.

Example 8: The first networked microphone device of Example 6, wherein the second neural network is identical to the first neural network.

Example 9: The first networked microphone device of Example 1, wherein the program instructions that are executable by the at least one processor such that the first networked microphone device is configured to determine that a second networked microphone device has been added to a media playback system comprise program instructions that are executable by the at least one processor such that the first networked microphone device is configured to receive, from the second networked microphone device, a message that the second networked microphone device has been added to the media playback system.

Example 10: The first networked microphone device of Example 1, further comprising program instructions stored thereon that are executable by the at least one processor such that the first networked microphone device is configured to: before determining that a second networked microphone device has been added to a media playback system, transmit, via the network interface, the first portion of the sound data to a cloud-based computing system.

Example 11: The first networked microphone device of Example 1, wherein the program instructions that are executable by the at least one processor such that the first networked microphone device is configured to transmit, via the network interface, the first portion of the sound data to a second networked microphone device comprise program instructions that are executable by the at least one processor such that the first networked microphone device is configured to transmit, via the network interface, a first channel of the first portion of the sound data to a second networked microphone device, and further comprising program instructions stored thereon that are executable by the at least one processor such that the first networked microphone device is configured to transmit, via the network interface, a second channel of the first portion of the sound data to a third networked microphone device.

Example 12: A non-transitory computer-readable medium comprising program instructions stored thereon that are executable by at least one processor such that a first networked microphone device is configured to perform the functions of any one of Examples 1-11.

Example 13: A method of performing functions of any one of Examples 1-11.

The invention claimed is:

1. A system comprising:
  a networked microphone device comprising at least one microphone;
  a computing device;
  at least one processor;
  a wake-word engine configured to receive as input sound data received via the at least one microphone;
  a non-transitory computer-readable medium; and
  program instructions stored on the non-transitory computer-readable medium that are executable by the at least one processor such that the system is configured to:
    receive, via the at least one microphone of the networked microphone device, sound data;
    determine, using a first neural network via the wake-word engine, that at least a first portion of the sound data is representative of a wake word, wherein the first neural network is pre-loaded on the wake-word engine;
    determine that the computing device is available for processing of received sound data, wherein the networked microphone device and the computing device are connected via a local data network;
    based on determining that the first portion of the sound data is representative of the wake word and that the computing device is available for processing of received sound data, cause the first portion of the sound data to be transmitted to the computing device;
    begin determining a command, based on at least a second portion of the sound data, to be performed by the system; and
    use, by the computing device, a second neural network to determine whether the first portion of the sound data is representative of the wake word.

2. The system of claim 1, wherein the computing device determines that the first portion of the sound data is representative of the wake word, the system further comprising program instructions stored on the non-transitory computer-readable medium that are executable by the at least one processor such that the system is configured to:
  based on determining that the first portion of the sound data is representative of the wake word, cause the networked microphone device to output a response that indicates that the first portion of the sound data is representative of the wake word.

3. The system of claim 1, wherein the computing device determines that the first portion of the sound data is not representative of the wake word, the system further comprising program instructions stored on the non-transitory computer-readable medium that are executable by the at least one processor such that the system is configured to:

based on determining that the first portion of the sound data is not representative of the wake word, cease determining the command to be performed by the system.

4. The system of claim 1, wherein the computing device determines that the first portion of the sound data is not representative of the wake word, the system further comprising program instructions stored on the non-transitory computer-readable medium that are executable by the at least one processor such that the system is configured to:
  determine the command, based on the second portion of the sound data; and
  based on determining that the first portion of the sound data is not representative of the wake word, forego performing the command.

5. The system of claim 1, wherein the computing device determines that the first portion of the sound data is representative of the wake word, the system further comprising program instructions stored on the non-transitory computer-readable medium that are executable by the at least one processor such that the system is configured to:
  determine the command to be performed by the system; and
  based on determining that the first portion of the sound data is representative of the wake word, perform the command.

6. The system of claim 1, wherein the wake-word engine is a first wake-word engine, and wherein the second neural network is pre-loaded on a second wake-word engine on the computing device.

7. The system of claim 1, wherein the second neural network is identical to the first neural network.

8. The system of claim 1, wherein the program instructions that are executable by the at least one processor such that the system is configured to determine that the computing device is available for processing of received sound data comprise program instructions that are executable by the at least one processor such that the system is configured to determine that the computing device has available processing capacity to process the received sound data.

9. The system of claim 1, further comprising program instructions stored on the non-transitory computer-readable medium that are executable by the at least one processor such that the system is configured to:
  before determining that the computing device is available for processing of received sound data, transmit the first portion of the sound data to a cloud-based computing system.

10. The system of claim 1, wherein the program instructions that are executable by the at least one processor such that the system is configured to transmit the first portion of the sound data to the computing device comprise program instructions that are executable by the at least one processor such that the system is configured to transmit a first channel of the first portion of the sound data to the computing device, and wherein the system further comprises program instructions stored on the non-transitory computer-readable medium that are executable by the at least one processor such that the system is configured to transmit a second channel of the first portion of the sound data to a second computing device.

11. A non-transitory computer-readable medium comprising program instructions stored thereon that are executable by at least one processor such that a system comprising (i) a networked microphone device, (ii) a computing device, and (iii) a wake-word engine configured to receive sound data as input is configured to:

receive, via at least one microphone of the networked microphone device, sound data;

determine, using a first neural network via the wake-word engine, that at least a first portion of the sound data is representative of a wake word, wherein the first neural network is pre-loaded on the wake-word engine;

determine that the computing device is available for processing of received sound data, wherein the networked microphone device and the computing device are connected via a local data network;

based on determining that the first portion of the sound data is representative of the wake word and that the computing device is available for processing of received sound data, cause the first portion of the sound data to be transmitted to the computing device;

begin determining a command, based on at least a second portion of the sound data, to be performed by the system; and use, by the computing device, a second neural network to determine whether the first portion of the sound data is representative of the wake word.

12. The computer-readable medium of claim 11, wherein the computing device determines that the first portion of the sound data is not representative of the wake word, and wherein the computer-readable medium further comprises program instructions stored thereon that are executable by the at least one processor such that the system is configured to:

based on determining that the first portion of the sound data is not representative of the wake word, cease determining the command to be performed by the system.

13. The computer-readable medium of claim 11, wherein the computing device determines that the first portion of the sound data is not representative of the wake word, and wherein the computer-readable medium further program instructions stored thereon that are executable by the at least one processor such that the system is configured to:

determine the command, based on the second portion of the sound data, to be performed by the system; and based on determining that the first portion of the sound data is not representative of the wake word, forego performing the command.

14. The computer-readable medium of claim 11, wherein the computing device determines that the first portion of the sound data is not representative of the wake word, and wherein the computer-readable medium further comprises program instructions stored thereon that are executable by the at least one processor such that the system is configured to:

determine the command to be performed by the system; and based on determining that the first portion of the sound data is representative of the wake word, perform the command.

15. The computer-readable medium of claim 11, wherein the wake-word engine is a first wake-word engine, and wherein the second neural network is pre-loaded on a second wake-word engine on the computing device.

16. The computer-readable medium of claim 11, wherein the program instructions that are executable by the at least one processor such that the system is configured to determine that the computing device is available for processing of received sound data comprise program instructions that are executable by the at least one processor such that the system is configured to determine that the computing device has available processing capacity to process the received sound data.

17. A method carried out by a system comprising (i) a networked microphone device, (ii) a computing device, and (iii) a wake-word engine configured to receive sound data as input, the method comprising:

receiving, via at least one microphone of the networked microphone device, sound data;

determining, using a first neural network via the wake-word engine, that at least a first portion of the sound data is representative of a wake word, wherein the first neural network is pre-loaded on the wake-word engine;

determining that the computing device is available for processing of received sound data, wherein the networked microphone device and the computing device are connected via a local data network;

based on determining that the first portion of the sound data is representative of the wake word and that the computing device is available for processing of received sound data, causing the first portion of the sound data to be transmitted to the computing device;

beginning to determine a command, based on at least a second portion of the sound data, to be performed by the system; and using, by the computing device, a second neural network to determine whether the first portion of the sound data is representative of the wake word.

18. The method of claim 17, wherein the computing device determines that the first portion of the sound data is not representative of the wake word, and wherein the method further comprises:

based on determining that the first portion of the sound data is not representative of the wake word, ceasing determining the command to be performed by the system.

19. The method of claim 17, wherein the computing device determines that the first portion of the sound data is not representative of the wake word, and wherein the method further comprises:

determining the command, based on the second portion of the sound data, to be performed by the system; and based on determining that the first portion of the sound data is not representative of the wake word, foregoing performing the command.

20. The method of claim 17, wherein the wake-word engine is a first wake-word engine, and wherein the second neural network is pre-loaded on a second wake-word engine on the computing device.

* * * * *